(12) United States Patent
Lee

(10) Patent No.: US 12,219,569 B2
(45) Date of Patent: Feb. 4, 2025

(54) METHOD FOR RECEIVING DOWNLINK CONTROL INFORMATION BAND AND USER EQUIPMENT USING THE SAME

(71) Applicant: Acer Incorporated, New Taipei (TW)

(72) Inventor: Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 97 days.

(21) Appl. No.: 17/237,072

(22) Filed: Apr. 22, 2021

(65) Prior Publication Data

US 2021/0377996 A1    Dec. 2, 2021

Related U.S. Application Data

(60) Provisional application No. 63/031,583, filed on May 29, 2020.

(51) Int. Cl.
*H04W 72/23* (2023.01)

(52) U.S. Cl.
CPC ..................... *H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 9,398,578 B2 | 7/2016 | Kim et al. | |
| 2010/0254268 A1 | 10/2010 | Kim et al. | |
| 2013/0315113 A1* | 11/2013 | Seo | H04L 5/0098 370/280 |
| 2017/0374569 A1 | 12/2017 | Lee et al. | |
| 2019/0159251 A1 | 5/2019 | Li et al. | |
| 2019/0349780 A1 | 11/2019 | Li et al. | |
| 2021/0321440 A1* | 10/2021 | Takeda | H04W 72/23 |
| 2022/0053540 A1* | 2/2022 | Takeda | H04W 72/23 |
| 2022/0141857 A1* | 5/2022 | Lee | H04W 72/23 370/329 |
| 2022/0191913 A1* | 6/2022 | Matsumura | H04L 1/1896 |
| 2022/0312456 A1* | 9/2022 | Guo | H04L 1/1822 |

(Continued)

FOREIGN PATENT DOCUMENTS

| | | | |
|---|---|---|---|
| CA | 3085655 A1 * | 1/2021 | ........... H04L 1/1861 |
| EP | 3627888 | 3/2020 | |
| KR | 20130116920 | 10/2013 | |

(Continued)

OTHER PUBLICATIONS

3GPP TSG RAN WG1 #57 R1-091874, Overview of Separate and Joint PDCCH Coding, May 4-8, 2009 (Year: 2009).*

(Continued)

*Primary Examiner* — Jeffrey M Rutkowski
*Assistant Examiner* — Luna Weissberger
(74) *Attorney, Agent, or Firm* — JCIPRNET

(57) ABSTRACT

An aspect of the disclosure includes a method for, including: determining a first set of candidate number of a first set of aggregation level (AL) for receiving a first DCI; and receiving the first DCI according to the first set of candidate number and the first set of AL on a first cell, wherein the first DCI is configured for scheduling PDSCHs on a plurality of cells, and the plurality of cells comprises a second cell and a third cell, and the first set of candidate number and the first set of AL are corresponding to a search space with a first identity.

30 Claims, 22 Drawing Sheets

(56) References Cited

U.S. PATENT DOCUMENTS

2022/0386295 A1* 12/2022 Zhang ................ H04W 72/046

FOREIGN PATENT DOCUMENTS

| TW | 202008812 | 2/2020 |
| WO | 2020001225 | 1/2020 |
| WO | 2020053942 | 3/2020 |

OTHER PUBLICATIONS

3GPP TSG RAN WG1 Meeting 91 R1-1720591, Discussion on aggregation level 16 for NR PDCCH, Nov. 27-Dec. 1, 2017 (Year: 2017).*

3GPP TS 36.213 V14.14.0 (Mar. 2020) section (Year: 2020).*

Vivo, "Discussion on the search space configuration of cross-carrier scheduling", 3GPP TSG RAN WG1 Meeting #95, Nov. 2018, pp. 1-5.

Samsung, "Corrections on HARQ Management", 3GPP TSG RAN WG1 #AH 1801, Jan. 2018, pp. 1-6.

"Search Report of Europe Counterpart Application", issued on Oct. 22, 2021, p. 1-p. 13.

Oppo, "On search space of cross-carrier scheduling", 3GPP TSG RAN WG1 Meeting #95, R1-1812834, Nov. 12-16, 2018, pp. 1-8.

* cited by examiner first cell group : Cell A, Cell C, Cell D
second cell group : Cell B

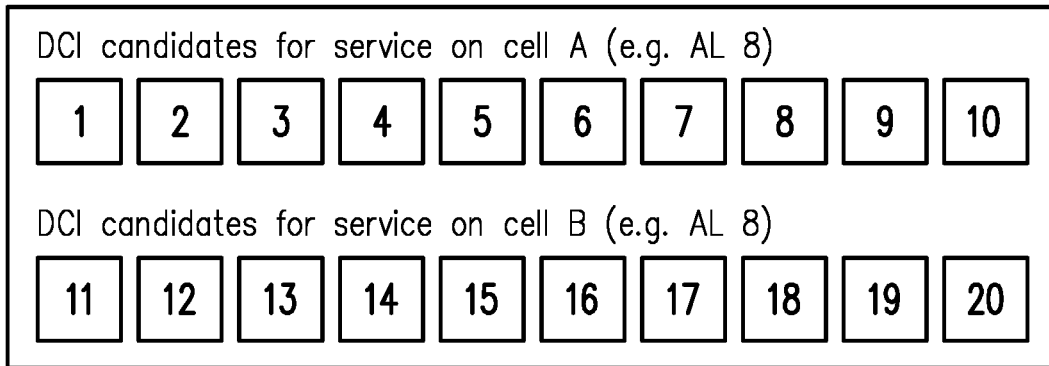
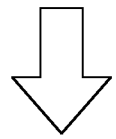
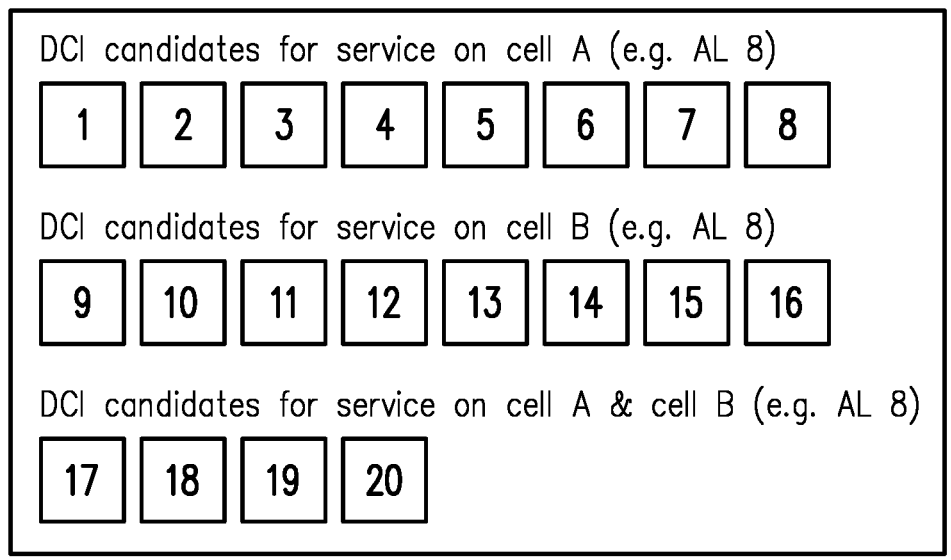
FIG. 11A

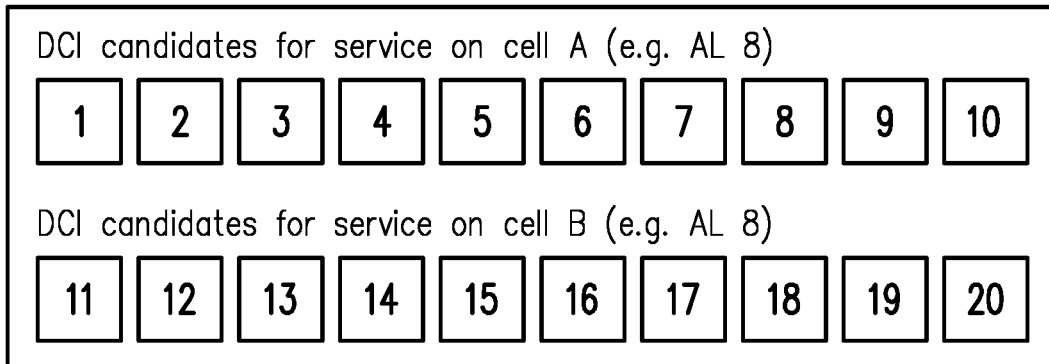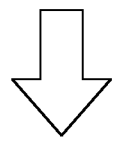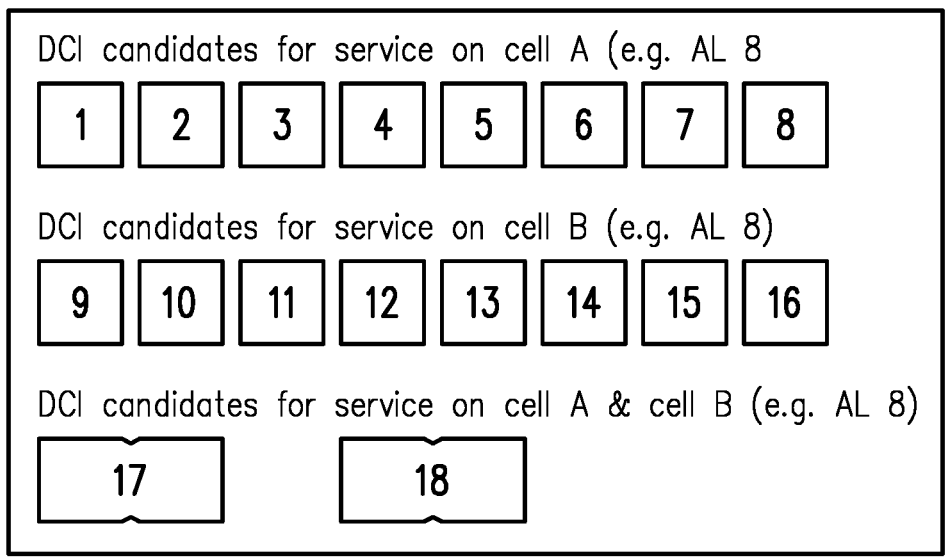
FIG. 11B

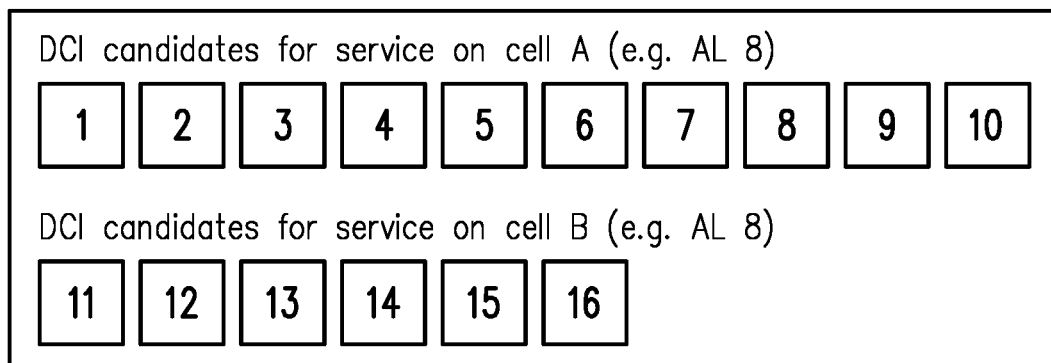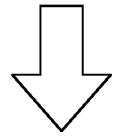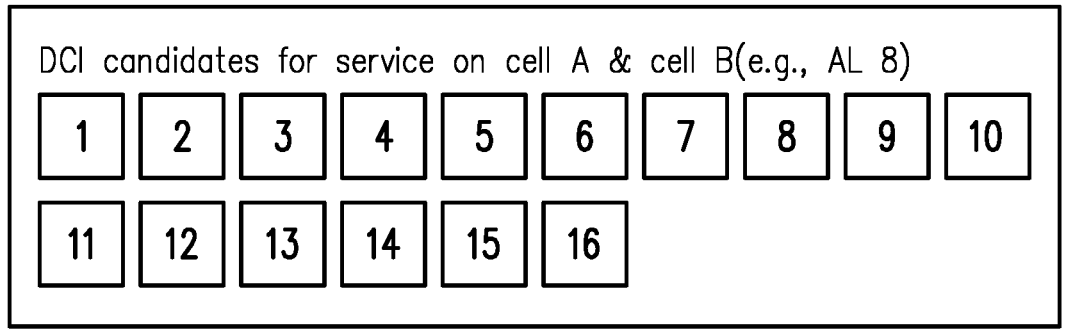
FIG. 15B

SS Configuration of SS #1 in Cell A aggregationLevel1_A   10
aggregationLevel2_A   10
aggregationLevel4_A   10
aggregationLevel8_A   10
aggregationLevel16_A  10

~1902

SS Configuration of SS #1 in Cell B

1901~ aggregationLevel1_B   10
aggregationLevel2_B   10
aggregationLevel4_B   10
aggregationLevel8_B   10
aggregationLevel16_B  10 aggregationLevel4     8
aggregationLevel8     6
aggregationLevel6     2

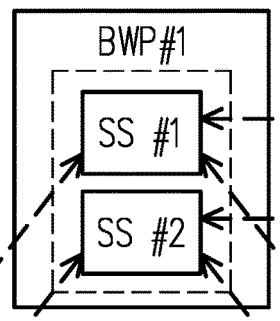
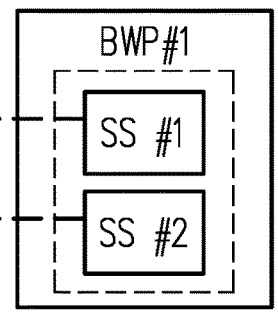
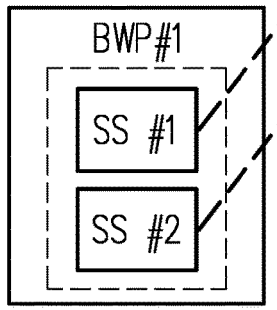
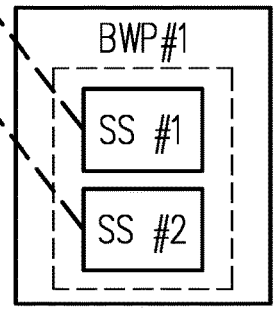

Configuration of SS #1 in Cell D aggregationLevel1_D   10
aggregationLevel2_D   10
aggregationLevel4_D   10
aggregationLevel8_D   10
aggregationLevel16_D  10

Configuration of SS #1 in Cell C aggregationLevel1_C   10
aggregationLevel2_C   10
aggregationLevel4_C   10
aggregationLevel8_C   10
aggregationLevel16_C  10

FIG. 19

SS Configuration of SS #1 in Cell A

| aggregationLevel1_A | 10 |
| aggregationLevel2_A | 10 |
| aggregationLevel4_A | 10 |
| aggregationLevel8_A | 10 |
| aggregationLevel16_A | 10 |

SS Configuration of SS #1 in Cell B

2001 —
| aggregationLevel1_B | 10 |
| aggregationLevel2_B | 10 |
| aggregationLevel4_B | 10 |
| aggregationLevel8_B | 10 |
| aggregationLevel16_B | 10 |

2001' —
| aggregationLevelR | 0.5 |
| N | 2 |

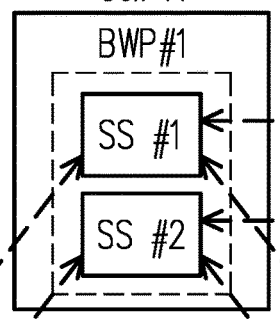

Cell A
BWP#1
SS #1
SS #2

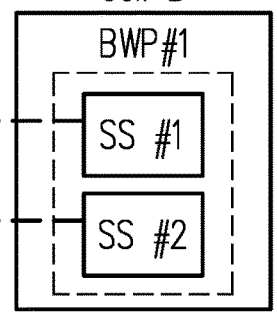

Cell B
BWP#1
SS #1
SS #2

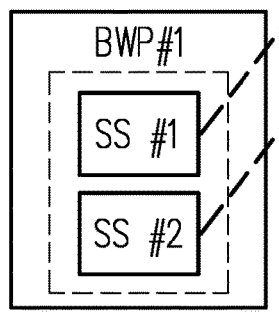

Cell D
BWP#1
SS #1
SS #2

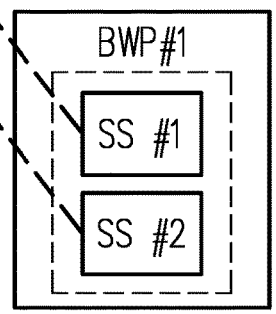

Cell C
BWP#1
SS #1
SS #2

Configuration of SS #1 in Cell D

| aggregationLevel1_D | 10 |
| aggregationLevel2_D | 10 |
| aggregationLevel4_D | 10 |
| aggregationLevel8_D | 10 |
| aggregationLevel16_D | 10 |

Configuration of SS #1 in Cell C

| aggregationLevel1_C | 10 |
| aggregationLevel2_C | 10 |
| aggregationLevel4_C | 10 |
| aggregationLevel8_C | 10 |
| aggregationLevel16_C | 10 |

FIG. 20

METHOD FOR RECEIVING DOWNLINK CONTROL INFORMATION BAND AND USER EQUIPMENT USING THE SAME

CROSS-REFERENCE TO RELATED APPLICATION

This application claims the priority benefit of U.S. provisional application Ser. No. 63/031,583, filed on May 29, 2020. The entirety of the above-mentioned patent application is hereby incorporated by reference herein and made a part of this specification.

TECHNICAL FIELD

This disclosure is directed to a method for receiving downlink control information and a user equipment using the same.

BACKGROUND

Third generation global partnership project (3GPP) are developing the 5G wireless access technology, known as new radio (NR). 5G NR is intended to address a variety of usage scenarios to meet new requirements associated with latency, reliability, security, scalability (e.g., with Internet of Things (IoT)), and other requirements. 5G NR includes services related to enhanced mobile broadband (eMBB), large-scale machine type communication (mMTC), and ultra-reliable low-latency communication (URLLC). Some aspects of 5G NR may be based on the 4G Long Term Evolution (LTE) standard. For example, 5G NR includes advanced techniques, such as carrier aggregation (CA), coordinated multipoint (CoMP) transmissions/reception, multiple-input multiple-output (MIMO), etc.

Carrier aggregation is utilized in 5G NR system or the other future wireless communication system, by which more than one carriers (e.g., component carriers, serving cells) may be aggregated to achieve a wider band transmission. The CA would increase bandwidth flexibility by aggregating multiple carriers. When a UE is configured with the CA, the UE has the ability to receive and/or transmit packets via one or multiple carriers to increase the overall system throughput.

Besides, in the future wireless communication system, e.g. 5G NR system, a bandwidth part (BWP) may be used to allocate some bands to the UE which has difficulty in supporting a broadband in a wireless communication system using the broadband. Various numerologies (e.g., Sub-carrier spacing (SCS), Cyclic Prefix (CP) length, etc.) may be supported for the same carrier in the future wireless communication system. That is, depending on various numerologies are supported in a carrier, transceiving numerologies may be set differently according to the BWPs. A BWP may include a set of consecutive physical resource blocks (PRBs) in the future wireless communication system.

However, there still exists a need for further improvements in 5G NR technology. These improvements may also be applicable to other multi-access technologies and the communication standards that employ these technologies. For example, in the current specification of 5G NR system, how to apply a DCI for cross-carrier scheduling when applying CA has not been specifically specified yet. But such a specification is needed.

SUMMARY

Accordingly, the disclosure is directed to a method for receiving downlink control information and a user equipment using the same.

In one of exemplary embodiments, the disclosure is directed to a method for receiving downlink control information, and the method would include but no limited to: determining a first set of candidate number of a first set of aggregation level (AL) for receiving a first DCI; and receiving the first DCI according to the first set of candidate number and the first set of AL on a first cell, wherein the first DCI is configured for scheduling PDSCHs on a plurality of cells, and the plurality of cells comprises a second cell and a third cell, and the first set of candidate number and the first set of AL are corresponding to a search space with a first identity.

In one of the exemplary embodiments, the disclosure is directed to a UE which would include not limit to: a storage medium, a transceiver, and a processor coupled to the storage medium, and configured to: determining a first set of candidate number of a first set of aggregation level (AL) for receiving a first DCI; and receiving the first DCI according to the first set of candidate number and the first set of AL on a first cell, wherein the first DCI is configured for scheduling PDSCHs on a plurality of cells, and the plurality of cells comprises a second cell and a third cell, and the first set of candidate number and the first set of AL are corresponding to a search space with a first identity.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 11A and 11B are schematic diagrams of search space design in a first scenario according to an embodiment of the disclosure.

FIGS. 15A and 15B are schematic diagrams of search space design in a first scenario according to an embodiment of the disclosure.

FIG. 19 is a schematic diagram of determining a first set of candidate number of a first set of aggregation level for receiving a first DCI according to an embodiment of the disclosure.

FIG. 20 is a schematic diagram of determining a first set of candidate number of a first set of aggregation level for receiving a first DCI according to an embodiment of the disclosure.

DESCRIPTION OF THE EMBODIMENTS

Figure 1:
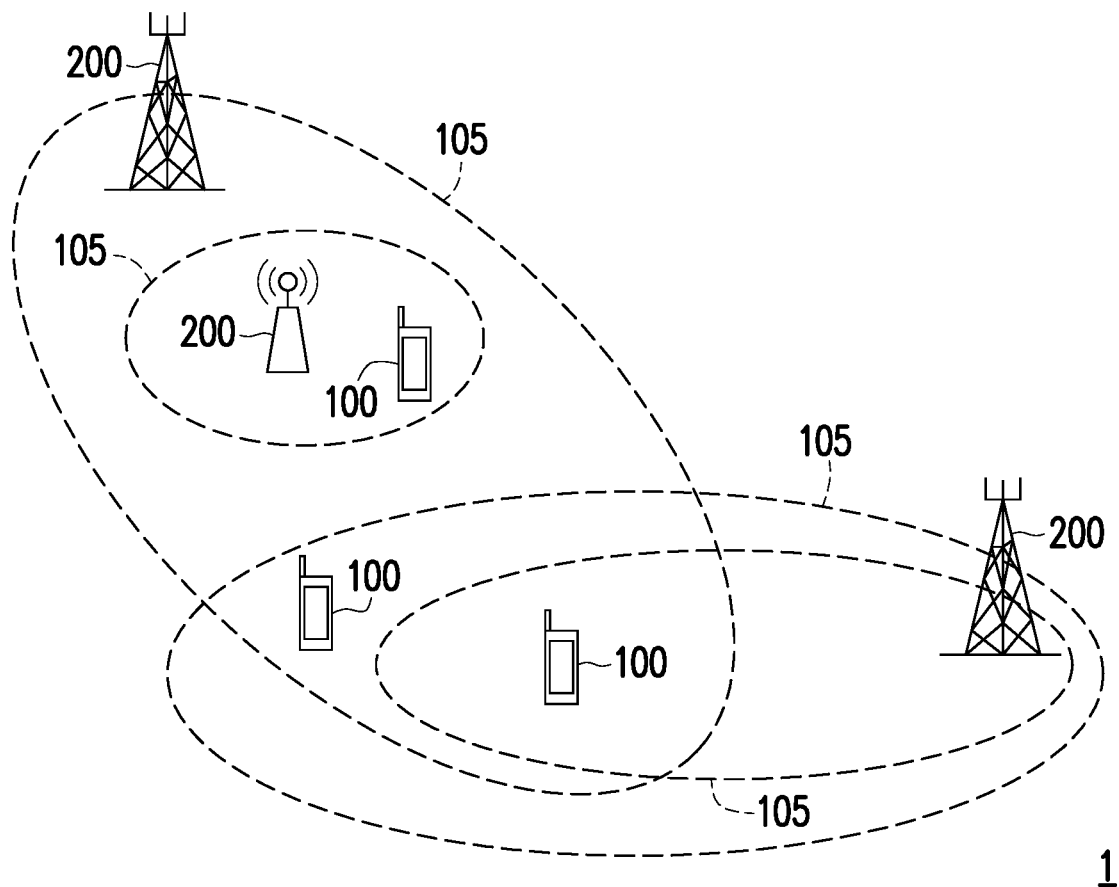
FIG. 1 is a schematic diagram of a wireless communication system according to an embodiment of the disclosure.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

Reference will now be made in detail to the embodiments of the disclosure, examples of which are illustrated in the accompanying drawings. Wherever possible, the same reference numbers are used in the drawings and the description to refer to the same or like parts.

Several aspects of wireless communication systems will now be presented with reference to various apparatus and methods. These apparatus and methods will be described in the following detailed description and illustrated in the accompanying drawings by various elements, such as blocks, components, circuits, processes, algorithms, etc. These elements may be implemented using electronic hardware, computer software, or any combination thereof. Whether such elements are implemented as hardware or software depends upon the particular application and design constraints imposed on the overall system. Accordingly, in one or more example embodiments, the functions described in this disclosure may be implemented in hardware, software, or any combination thereof. If implemented in software, the functions may be stored on or encoded as one or more instructions or code on a computer-readable medium.

The term "base station" (BS) in this disclosure could be synonymous, for example, with a variation or a sub-variation of a "gNodeB" (gNB), an "eNodeB" (eNB), a Node-B, an advanced BS (ABS), a transmission reception point (TRP), an unlicensed TRP, a base transceiver system (BTS), an access point, a home BS, a relay station, a scatterer, a repeater, an intermediate node, an intermediary, satellite-based communication BSs, and so forth.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

FIG. 1 is a schematic diagram of a wireless communication system according to an embodiment of the disclosure. Referring to FIG. 1, the wireless communication system 1 includes at least, but not limited to, UEs 100 and base stations 200. The UEs 100 and the base stations 200 use a mobile (or cellular) communication network (e.g., 5G, or a higher generation mobile network). In some embodiments, a UE 100 with carrier aggregation (CA) function and a BS 200 may communicate with each other by using a plurality of cells 105. More than one cells are aggregated to achieve a wider band transmission in the wireless communication system 1. In detail, in carrier aggregation operation, a UE 100 may communicate with a single base station 200 by utilizing multiple carriers, and may also communicate with multiple base stations 200 simultaneously on different carriers. That is, the communication links between the UEs 100 and the base stations 200 may be through one or more carriers. Each aggregated carrier is referred to as a component carrier (CC). Each cell 105 may be referred to one component carrier in CA. The coverage of the cells 105 may differ due to that CCs on different frequency bands will experience different pathloss. Since the UEs 100 and the base stations 200 may use one or more carriers to communicate with each other, cross-carrier scheduling is needed in the wireless communication system 1. Generally, in the cross-carrier scheduling operation, scheduling information for one cell may be transmitted on another cell.

In some embodiments, control information may be exchanged between a UE 100 and a BS 200 on a cell, though the UE 100 and the BS 200 may use the control information for scheduling communications on another cell. Namely, control signaling for a scheduled cell may be transmitted on a scheduling cell. It should be noted that, the scheduling cell and the scheduled cell may be the same or different cell(s). Specifically, the UE 100 is able to decode control information (e.g., physical downlink control channel (PDCCH)) on the scheduling cell to obtain the scheduling information for both the scheduling cell and the scheduled cell. The control information transmitted on the scheduling cell may provide a grant to the UE 100 to decode a data or control channel on a scheduled cell.

Figure 2:
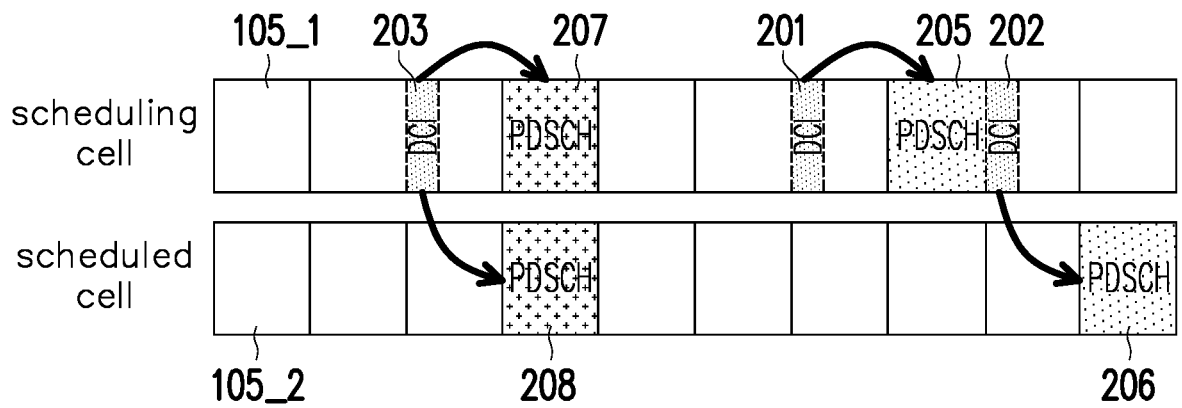
FIG. 2 is a schematic diagram of a scheduling cell and a scheduled cell according to an embodiment of the disclosure.

FIG. 2 is a schematic diagram of a scheduling cell and a scheduled cell according to an embodiment of the disclosure. Referring to FIG. 2, control information in the control region of the scheduling cell 105_1 may be used to schedule resources for data (e.g., physical downlink shared channel (PDSCH)) for a different cell referred to as the scheduled cell 105_2. Namely, the UE 100 may monitor the control information carried by the scheduling cell 105_1 to obtain the scheduling information of the scheduling cell 105_1 and the scheduled cell 105_2. In FIG. 2, a DCI 201 in the PDCCH transmitted via the scheduling cell 105_1 may be used to schedule a physical downlink shared channel (PDSCH) 205 of the scheduling cell 105_1. A DCI 202 in the PDCCH transmitted via the scheduling cell 105_1 may be used to schedule a PDSCH 206 of the scheduled cell 105_2. A DCI 203 in the PDCCH transmitted via the scheduling cell 105_1 may be used to schedule PDSCHs 207 and 208 of the scheduling cell 105_1 and the scheduled cell 105_2. It should be noted that, the amount of the scheduled cell(s) corresponding to one scheduling cell the is not limited in the disclosure. In some embodiments, a plurality of PDSCHs of a plurality of scheduled cells may be scheduled by a DCI transmitted via the scheduling cell. For example, there may be a DCI in the PDCCH transmitted via the scheduling cell 105_1 which is used to schedule two PDSCHs of the scheduled cell 105_2 and another scheduled cell.

In some embodiments, downlink control information (DCI) may be carried in a PDCCH. PDCCH may carry DCI in control channel elements (CCEs). For example, in LTE system, a CCE may consist of nine logically contiguous resource element groups (REGs), and each REG may contain 4 resource elements (REs). In 5G NR system, a CCE may consist of six logically contiguous resource element groups (REGs), and each REG may contain 12 resource elements (REs). The DCI may include information regarding DL scheduling assignments, UL resource grants, transmission scheme, UL power control, HARQ information, modulation and coding scheme (MCS) and other information. The size and format of the DCI may differ depending on the type and amount of information that is carried by the DCI.

In some embodiments, a search space (SS) refers to the area in the downlink resource where PDCCH may be carried. The UE 100 may perform blind detection (also known as blind decoding) throughout these search space to try to find a needed DCI. It should be noted that, "search space" in this disclosure may be also known as search space set. The search space may include a UE-specific search space or a common search space. Further, the frequency band occupied by PDCCH in the frequency domain and the number of OFDM symbols occupied by PDCCH in the time domain are defined in a control resource set (CORESET). Therefore, the UE 100 may confirm some possible resource positions of PDCCH according to a control resource set (CORESET) and a search space so as to perform blind detection of PDCCH accordingly.

A CORESET configuration may include a control resource set ID, a set of frequency domain resource of a BWP of a serving cell, and contiguous time duration of the CORESET in number of symbols. A search space configuration may include at least one of a search space ID, a control resource set ID, monitoring slot periodicity and offset, monitoring symbols within slot, DCI format for monitoring, and number of PDCCH candidates per aggregation level (AL) (nrofCandidates). A PDCCH candidate may include Q CCEs with consecutive logical CCE indices, wherein Q is the aggregation level of the CCEs (i.e., the number of CCEs utilized for a DCI). In the disclosure, "candidate number" may be known as number of PDCCH candidate(s) for a AL.

Based on above, in cross-carrier scheduling (also known as cross-cell scheduling) operation, the control information of the scheduling cell and the control information of at least one scheduled cell may be carried in PDCCH of the scheduling cell, and the UE 100 is able to obtain DL/UL scheduling information of a scheduling cell and DL/UL scheduling information of at least one scheduled cell according to control information transmitted via the scheduling cell. In some embodiments, the UE 100 may perform blind detection of PDCCH respectively according to a search space configuration of a search space associated with the scheduling cell and a search space configuration of a search space associated with the scheduled cell, so as to receive DCI (e.g., DCI 203 in FIG. 2) for scheduling multiple cells or/and DCI (e.g., DCI 201 and 202 in FIG. 2) for scheduling one of the multiple cells. In some embodiments, there is linkage between the search space of the scheduled cell and the search space of the scheduling cell. Part of parameters in the search space configuration corresponding to a search space identify and the scheduled cell is identical with part of parameters in the search space configuration corresponding to the same search space identify and the scheduling cell. For example, in the search space configurations corresponding to the same search space identify but respectively corresponding to the different cells, number of PDCCH candidates per aggregation level and DCI format for monitoring may be configured separately, but the other part of the parameters in the search space configurations may be the same.

Figure 3:
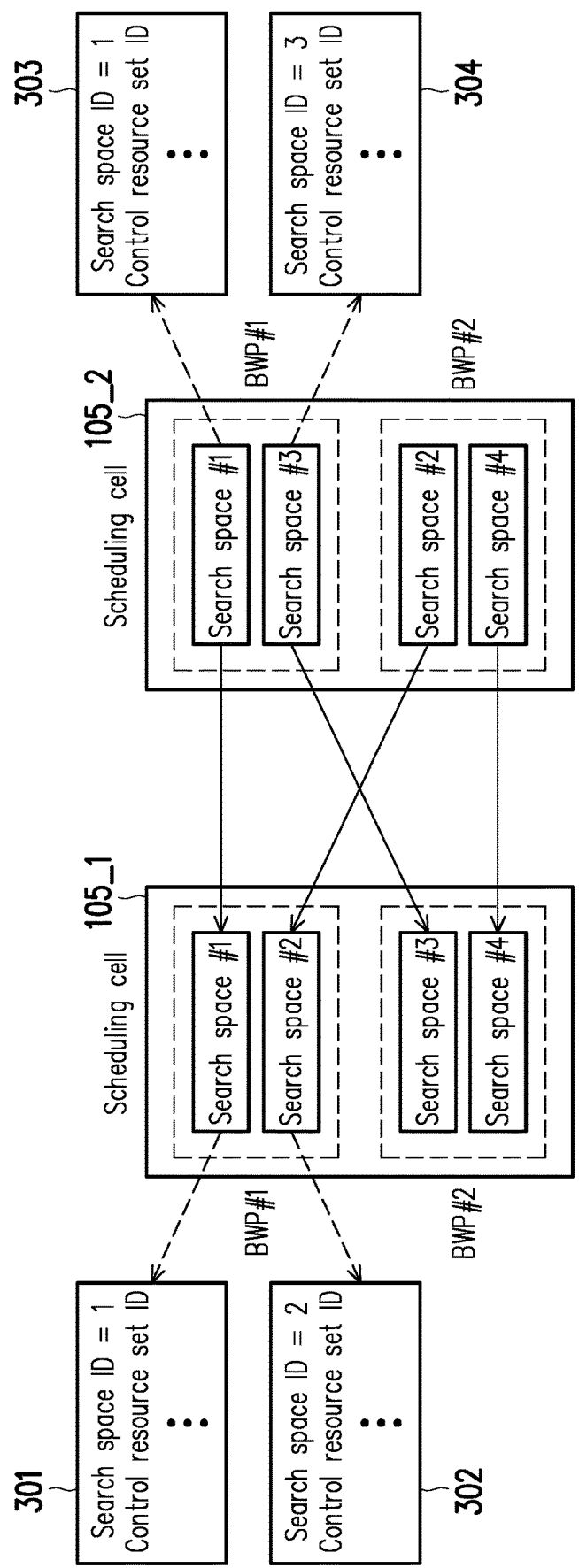
FIG. 3 is a schematic diagram of search spaces of the different cells according to an embodiment of the disclosure.

FIG. 3 is a schematic diagram of search spaces of the different cells according to an embodiment of the disclosure. Referring to FIG. 3, a BWP, such as BWP #1 and BWP #2 of the scheduling cell 105_1 and BWP #1 and BWP #2 of the scheduled cell 105_2, may include at least one contiguous PRB in frequency domain. A BWP may include at least one sub-band, and a sub-band may refer to part of a BWP or whole BWP, a frequency range, at least one PRB, etc. Search space #1 (i.e., search space with search space ID '1') and search space #2 (i.e., search space with search space ID '2') are configured to BWP #1 of the scheduling cell 105_1, and search space #3 and search space #4 are configured to BWP #2 of the scheduling cell 105_1. Besides, search space #1 and search space #3 are configured to BWP #1 of the scheduled cell 105_2, and search space #2 and search space #4 are configured to BWP #2 of the scheduled cell 105_2. In a case, when BWP #1 of the scheduling cell 105_1 and BWP #1 of the scheduled cell 105_2 are activated simultaneously, the UE 100 may use the search space configurations 301 and 302 of search space #1 and search space #2 to monitoring PDCCH on the scheduling cell 105_1 and use the search space configurations 303 and 304 of search space #1 and search space #3 to monitoring PDCCH on the scheduling cell 105_1, wherein the search space configuration 301 is partially the same as the search space configuration 303 due to the same search space ID. For example, the parameters (e.g. a CORESET ID) for indicating a starting location of the control information region carrying PDCCH are the same in the search space configuration 301 and the search space configuration 303, wherein the search space configuration 301 and the search space configuration 303 are corresponding to the same search space ID.

Figure 4:
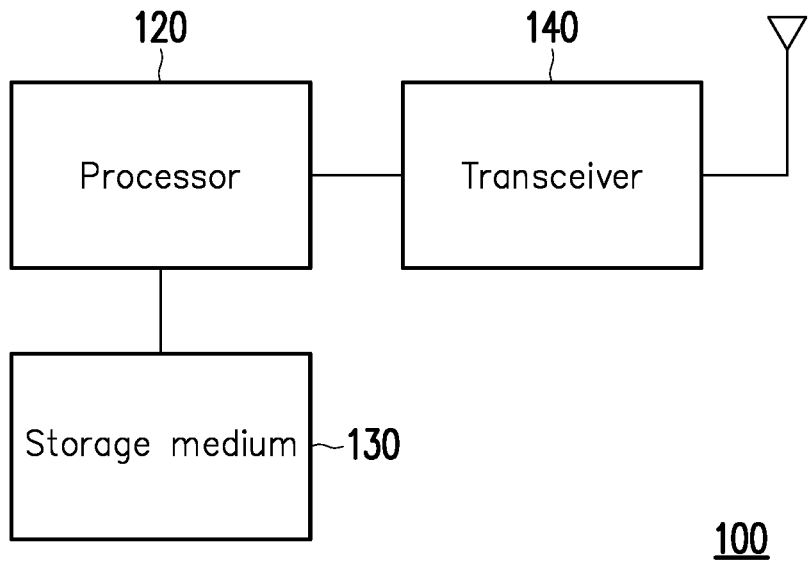
FIG. 4 is a block diagram of a UE 100 according to an embodiment of the disclosure.

FIG. 4 is a block diagram of a UE 100 according to an embodiment of the disclosure. Referring to FIG. 4, the UE 100 may include at least (but not limited to) a processor 120, a storage medium 130 and a transceiver 140.

The processor 120 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU) or other similar components or a combination of the above components. The processor 120 is configured to perform a method for downlink reception in unlicensed band which will be described afterward.

The storage medium 130 is coupled to the processor 120, and is, for example, any type of a fixed or movable Random Access Memory (RAM), a Read-Only Memory (ROM), a flash memory, a Hard Disk Drive (HDD), a Solid State Drive (SSD), or similar components or a combination of the above components. The storage medium 130 stores a plurality of modules or programs for the processor 120 to access, such that the processor 120 may execute various communication functions of the UE 100.

The transceiver 140 is coupled to the processor 120. The transceiver 140 may receive a DL signal and transmit a UL signal. The transceiver 140 may execute operations of Low Noise Amplifying (LNA), impedance matching, analog-to-digital (ADC) converting, digital-to-analog (DAC) converting, frequency mixing, up-down frequency conversion, filtering, amplifying and/or similar operations. The transceiver 140 may further includes an antenna array, and the antenna array may include one or a plurality of antennas for transmitting and receiving omnidirectional antenna beams or directional antenna beams.

Figure 5:
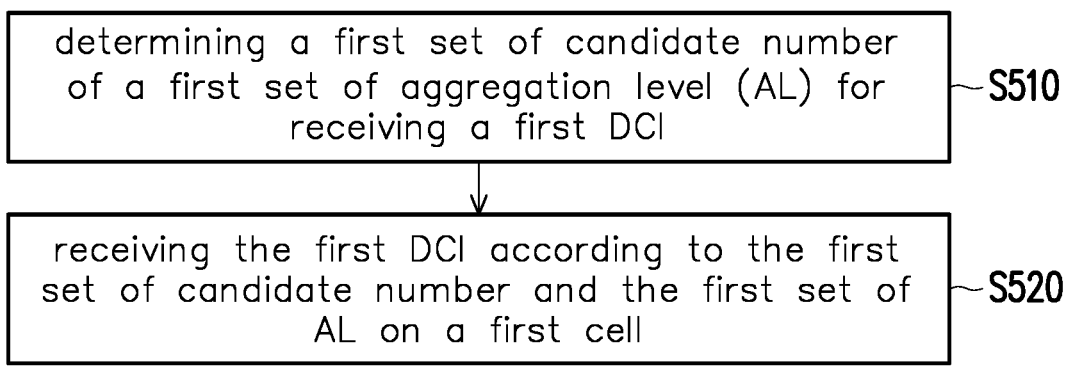
FIG. 5 is a flowchart of a method for d receiving downlink control information (DCI) according to an embodiment of the disclosure.

FIG. 5 is a flowchart of a method for receiving downlink control information (DCI) according to an embodiment of the disclosure. Referring to FIG. 5, the method of this embodiment is adapted for the UE 100 and the BS 200 under the wireless communication system 1 of FIG. 1. In the following paragraphs, the method of this embodiment is described first with reference to the components and modules of the UE 100. Nevertheless, the processes of this method may be adjusted according to the actual needs and thus are not limited to the following.

In step S510, the UE 100 may determine a first set of candidate number of a first set of aggregation level (AL) for receiving a first DCI. The first DCI is a multiple-cell scheduling DCI and includes control information for scheduling PDSCHs on multiple cells. That is, the first set of candidate number of the first set of aggregation level (AL) is determined by the UE 100 to monitor the first DCI so as to receive the first DCI. Namely, in the disclosure, the first set of candidate number of the first set of AL for receiving the first DCI may also be referred as the first set of candidate number of the first set of AL for monitoring the first DCI.

For example, DCI 203 in FIG. 3 may be a first DCI for scheduling PDSCHs on multiple cells. In some embodiments, before performing the blind detection to find the multiple-carrier scheduling DCI, the UE 100 may determine the first set of candidate number of the first set of aggregation level according to at least one of search space configurations respectively assigned to the multiple cells. Besides, an aggregation level indicates how many CCEs are allocated for a PDCCH, and the first set of aggregation level may include one or more aggregation levels. A candidate number of an aggregation level indicates how many PDCCH candidates at an aggregation level are allocated in the search space. Therefore, the first set of candidate number of the first set of aggregation level may include one or more candidate numbers at one or more aggregation levels.

In some embodiments, a minimum AL of the first set of AL for receiving the first DCI is larger than one CCE. For example, since the first DCI may carry the control information for multiple cells thus to have more data amount, the minimum AL of the first set of AL for receiving the first DCI may be 2 CCEs. In some embodiments, a maximum AL of the first set of AL for receiving the first DCI is larger than 16 CCEs. For example, since the first DCI may carry the control information for multiple cells thus to have more data amount, the maximum AL of the first set of AL for receiving the first DCI may be 32 CCEs.

In step S520, the UE 100 may receive the first DCI according to the first set of candidate number and the first set of AL on a first cell. After the UE 100 determines the first set of candidate number of the first set of aggregation level for receiving the first DCI, the US 100 may perform the blind detection of PDCCH by using one or more candidate numbers in the first set of candidate number and one or more corresponding aggregation levels in the first set of aggregation level. It should be noted that, the first DCI is configured for scheduling PDSCHs on a plurality of cells, and the plurality of cells on which the PDSCHs are scheduled together by the first DCI may include a second cell and a third cell. That is, the first cell may be a scheduling cell in cross-carrier scheduling operation, i.e., the first cell is a scheduling cell of the second cell and the third cell. Besides, the scheduling cell and the scheduled cell may be the same cell or different cells. Hence, in some embodiments, the first cell and one of the second cell and the third cell may be the same cell. In some embodiments, the first cell and the third cell may be the same cell. Namely, in some embodiments, one of the second cell and the third cell may be a scheduling cell in the cross-carrier scheduling operation, and another one of the second cell and the third cell may be a scheduled cell in the cross-carrier scheduling operation. In some embodiments, both of the second cell and the third cell may be scheduled cells in the cross-carrier scheduling operation.

Further, the first set of candidate number and the first set of AL are corresponding to a search space with a first identity. The first identity may be a search space ID. For example, in FIG. 3, when the activated BWP #1 of the scheduling cell 105_1 and the activated BWP #1 of the scheduled cell 105_2 are configured to correspond to search space #1, the UE 100 may perform the step S510 according to the search space configuration 301 associated with search space #1 and/or the search space configuration 303 associated with search space #1. In some embodiments, the search space configuration 301 of the scheduling cell 105_1 and the search space configuration 303 of the scheduled cell 105_2 may indicate the same CORESET ID in search space #1 but correspond to the different DCI formats and the different numbers of PDCCH candidates per aggregation level. In some embodiments, the search space configuration 301 of the scheduling cell 105_1 and the search space configuration 303 of the scheduled cell 105_2 may indicate the same CORESET ID in search space #1 but correspond to the same DCI formats and the different numbers of PDCCH candidates per aggregation level.

In some embodiments, the first set of candidate number of the first set of AL for receiving the first DCI is configured in a search space configuration of the second cell or/and a search space configuration of the third cell. Namely, the first set of candidate number of the first set of AL for receiving the first DCI may be configured in a search space configuration of a scheduling cell or/and a search space configuration of a scheduled cell. Besides, the UE 100 may use parameters in the search space configuration of at least one of the scheduling cell and the scheduled cell to determine the first set of candidate number of the first set of aggregation level for receiving the first DCI.

In some embodiments, the first set of candidate number for receiving the first DCI is counted for the third cell. In some embodiments, the first set of candidate number for receiving the first DCI is counted for the second cell. For example, number of PDCCH candidates for the first DCI may be counted for both second cell and the third cell with a ratio which could be configured by the BS 200. In some embodiments, the first set of candidate number for receiving the first DCI is counted for a shared candidate budget of the second cell and the third cell.

In some embodiments, the third cell is included in a cell group comprising at least one predetermined cell, and the second cell is included in another cell group comprising at least one other predetermined cell. Alternatively, in some embodiments, the second and the third cell are included in a cell group comprising a plurality of predetermined cells. The first cell which is a scheduled cell may be configured to be a scheduling cell of one or more cell groups. In some embodiments, the first DCI for multiple-cell scheduling is received according to a cell index of the second cell or a cell index of the third cell. Besides, the UE 100 may determine the third cell is one of the plurality of cells scheduled by the first DCI according to a cell index of the third cell in a field of the first DCI.

Figure 6:
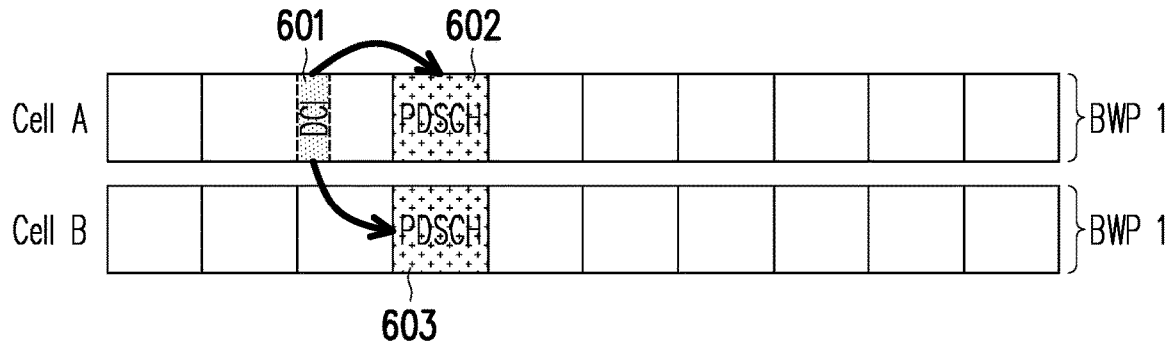
FIG. 6 is a schematic diagram of cross-carrier scheduling in a first scenario according to an embodiment of the disclosure.

FIG. 6 is a schematic diagram of cross-carrier scheduling in a first scenario according to an embodiment of the disclosure. Referring to FIG. 6, the cell A and the cell B are paired with each other one to one. The cell A is a scheduling cell of the cell B. The cell A is one cell of a first cell group of which the scheduling cell is the cell A, and the first cell group includes only one predetermined cell (i.e., cell A). The cell B is one of predetermined cells in a second cell group of which the scheduling cell is the cell A, and the second cell group comprises only one predetermined cell (i.e., cell B). In the first scenario, the UE 100 may determine the first set of candidate number of the first set of aggregation level for receiving a first DCI 601. Next, after performing the blind detection of PDCCH, the UE 100 may receive the first DCI 601 according to the first set of candidate number and the first set of AL on a first cell (i.e., cell A). Therefore, the UE 100 may know the scheduling information of PDSCHs 602 and 603 on the cell A and the cell B. Namely, the first DCI 601 for multiple-cell scheduling is configured for scheduling PDSCHs 602 and 603 on the cell A and the cell B.

Figure 7:
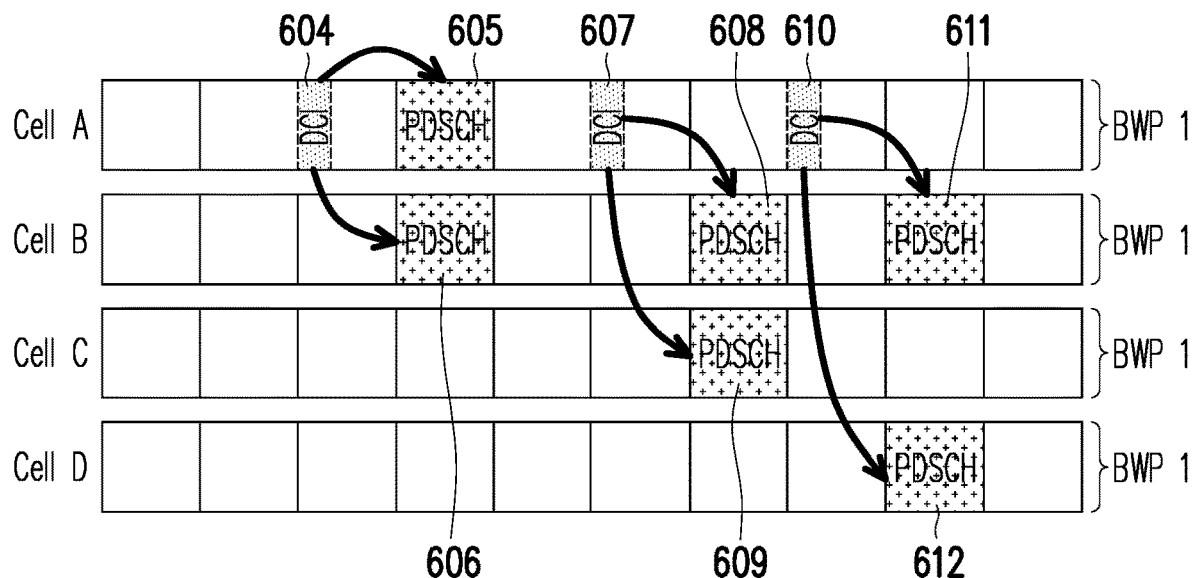
FIG. 7 is a schematic diagram of cross-carrier scheduling in a second scenario according to an embodiment of the disclosure.

FIG. 7 is a schematic diagram of cross-carrier scheduling in a second scenario according to an embodiment of the disclosure. Referring to FIG. 7, the cell A is a scheduling cell of the cell B, the cell C and the cell D. A first cell group may include one or more predetermined cells (i.e., the cell A, the cell C and the cell D). The second cell group comprises only one predetermined cell (i.e., cell B). The scheduling cell of the first cell group and the second cell group is the cell A. In the second scenario, the UE 100 may determine the first set of candidate number of the first set of aggregation level for receiving a first DCI 604. Next, after performing the blind detection of PDCCH, the UE 100 may receive the first DCI 604 according to the first set of candidate number and the first set of AL on a first cell (i.e., cell A). Therefore, the UE 100 may know the scheduling information of PDSCHs 605 and 606 on the cell A and the cell B. The UE 100 may use a cell index (e.g. cell ID) of the cell A to perform the blind detection of PDCCH so as to know the first DCI 604 is used for scheduling the cell A and the cell B. For example, the UE 100 may input the cell index into a function of blind detection of PDCCH so as to receive the first DCI 604 configured for scheduling PDSCHs 605 and 606 on the cell A and the cell B. Further, in some embodiments, the UE 100 may determine the cell A is one of the plurality of cells being cross-carrier scheduled according to a cell index of the cell A in a field of the first DCI 604. That is, the first DCI 604 may include a filed indicating which cell(s) is/are scheduled by the first DCI 604.

Based on the similar operation, the UE 100 may determine the first set of candidate number of the first set of aggregation level for receiving first DCI 607, and receive the first DCI 607 according to the first set of candidate number and the first set of AL on the cell A. Further, the first DCI 607 is received according to a cell index of the cell C, and there is one field of the first DCI 607 indicating the cell C is one of the plurality of cells being cross-carrier scheduled. Therefore, the UE 100 may know the scheduling information of PDSCHs 608 and 609 on the cell B and the cell C by the first DCI 607.

Based on the similar operation, the UE 100 may determine the first set of candidate number of the first set of aggregation level for receiving first DCI 610, and receive the first DCI 610 according to the first set of candidate number and the first set of AL on the cell A. Further, the first DCI 610 is received according to a cell index of the cell D, and there is one field of the first DCI 610 indicating the cell D is one of the plurality of cells been cross-carrier scheduled. Therefore, the UE 100 may know the scheduling information of PDSCHs 611 and 612 on the cell B and the cell D by the first DCI 610.

Figure 8:
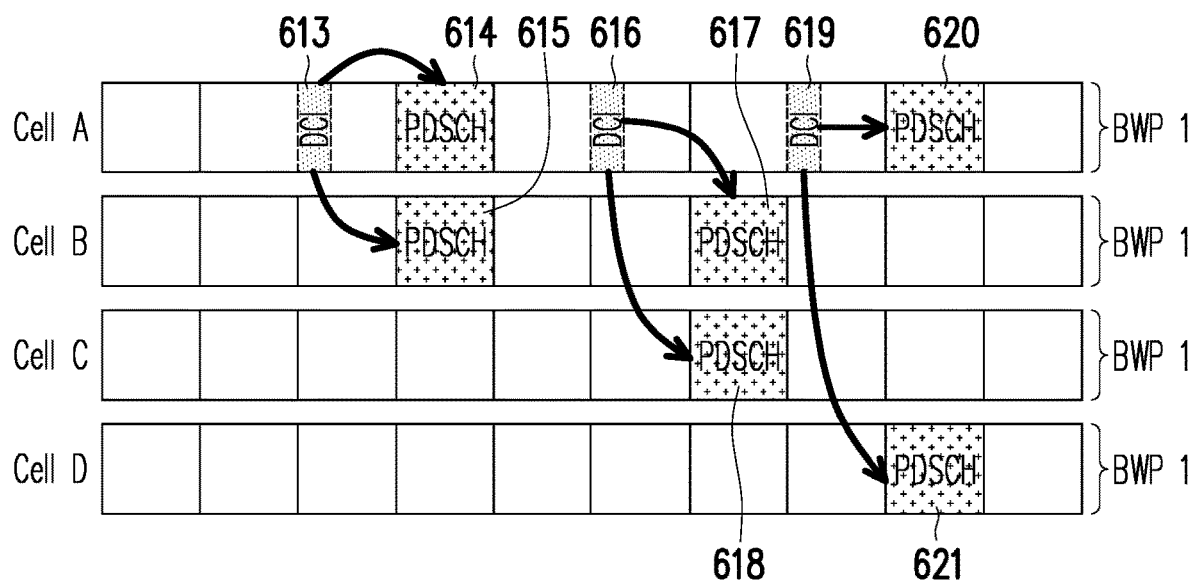
FIG. 8 is a schematic diagram of cross-carrier scheduling in a second scenario according to an embodiment of the disclosure.

FIG. 8 is a schematic diagram of cross-carrier scheduling in a third scenario according to an embodiment of the disclosure. Referring to FIG. 8, the cell A is a scheduling cell of the cell B, the cell C and the cell D. A first cell group may include one or more predetermined cells (i.e., the cell A and the cell C). The second cell group comprises one or more predetermined cells (i.e., the cell B and the cell D). The first cell group and the second cell group are scheduled by the cell A.

In the third scenario, the UE 100 may determine the first set of candidate number of the first set of aggregation level for receiving a first DCI 613. Next, after performing the blind detection of PDCCH, the UE 100 may receive the first DCI 613 according to the first set of candidate number and the first set of AL on a first cell (i.e., cell A). Therefore, the UE 100 may know the scheduling information of PDSCHs 614 and 615 on the cell A and the cell B. Further, the first DCI 613 may be received according to a cell index of the cell A and/or a cell index of the cell B, and there is one field of the first DCI 613 indicating each of the cell A and the cell B is one of the plurality of cells being cross-carrier scheduled. Therefore, the UE 100 may know the scheduling information of PDSCHs 614 and 615 on the cell A and the cell B by the first DCI 613.

Based on the similar operation, the UE 100 may determine the first set of candidate number of the first set of aggregation level for receiving first DCI 616, and receive the first DCI 616 according to the first set of candidate number and the first set of AL on the cell A. Further, the first DCI 616 may be received according to a cell index of the cell B and/or a cell index of the cell C, and there is one field of the first DCI 616 indicating each of the cell B and the cell C is one of the plurality of cells being cross-carrier scheduled. Therefore, the UE 100 may know the scheduling information of PDSCHs 617 and 618 on the cell B and the cell C by the first DCI 616.

Based on the similar operation, the UE 100 may determine the first set of candidate number of the first set of aggregation level for receiving first DCI 619, and receive the first DCI 619 according to the first set of candidate number and the first set of AL on the cell A. Further, the first DCI 619 may be received according to a cell index of the cell A and/or a cell index of the cell D, and there is one field of the first DCI 619 indicating each of the cell A and the cell D is one of the plurality of cells being cross-carrier scheduled. Therefore, the UE 100 may know the scheduling information of PDSCHs 620 and 621 on the cell A and the cell D by the first DCI 619.

In some embodiments, the UE 100 may know that whether there is a DCI for multiple-cell scheduling or a DCI for single-cell scheduling in the PDCCH according to the DCI format in the search space configuration. In some embodiments, the DCI format for multiple-cell scheduling or the DCI format for single-cell scheduling in the search space configuration may be determined and configured by the BS 200. Further, in some embodiments, the UE 100 may obtain the search space configuration from a Radio Resource Control (RRC) signal transmitted by the BS 200.

Figure 9:
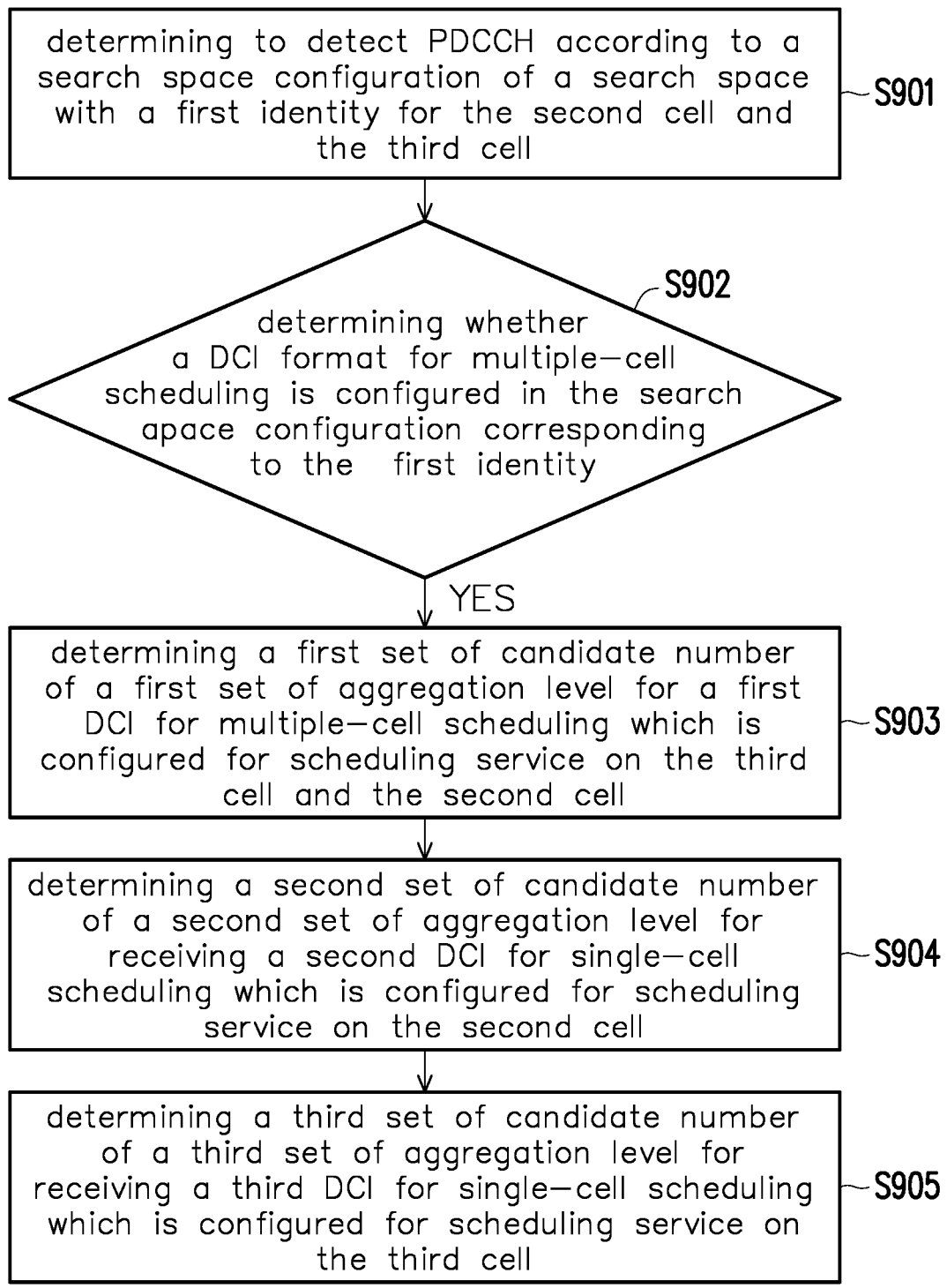
FIG. 9 is a flowchart of a method for receiving downlink control information (DCI) according to an embodiment of the disclosure.

FIG. 9 is a flowchart of a method for receiving downlink control information (DCI) according to an embodiment of the disclosure. In FIG. 9, the first cell is a scheduling cell, and the second cell and the third cell are scheduled by the first cell. Referring to FIG. 9, in step S901, the UE 100 may determine to detect PDCCH according to a search space configuration of a search space with a first identity for the second cell and the third cell. The first identity may be the search apace ID '#a'. Herein, the BWP corresponding to the search space #a with the search space ID '#a' is activated on the second cell, and the BWP corresponding to the search space with search space ID '#a' is also activated on the third cell. That is, when a BWP configured with the search space #a is activated on the second cell and a BWP configured with the search space #a is activated on the third cell, the UE 100 may perform the step S901.

In step S902, the UE 100 may determine whether a DCI format for multiple-cell scheduling is configured in the search apace configuration corresponding to the first identity. The second cell and the third cell are scheduled by a first DCI corresponding to a specific DCI format for multiple-cell scheduling.

If the determining result of step S902 is yes, in step S903, the UE 100 may determine a first set of candidate number of a first set of aggregation level for a first DCI for multiple-cell scheduling which is configured for scheduling service (e.g., PDSCHs) on the third cell and the second cell. Such that, the UE 100 may receive the first DCI for multiple-cell scheduling on the first cell. Herein, the first cell may be the second cell or the third cell, or the first cell may not be either the second cell or the third cell.

Besides, if the determining result of step S902 is no, which means there is not a multiple-cell scheduling for the second cell and the third cell, the UE 100 may directly perform the blind detection of PDCCH without determining the first set of candidate number of the first set of aggregation level for the first DCI for multiple-cell scheduling.

In step S904, the UE 100 may determine a second set of candidate number of a second set of aggregation level for receiving a second DCI for single-cell scheduling which is configured for scheduling service (e.g., PDSCHs) on the second cell. The second DCI is a single-cell scheduling DCI for scheduling a PDSCH on the second cell. The UE 100 may receive the second DCI according to the second set of candidate number and the second set of AL on the first cell. The second DCI is configured for scheduling a PDSCH on the second cell, and the second set of candidate number and the second set of AL are corresponding to the search space with the first identity.

In some embodiments, the second set of candidate number of the second set of AL is configured in a search space configuration of the second cell.

In some embodiments, the second set of candidate number of the second set of AL is determined according to at least one of the first set of candidate number of the first set of AL, a fourth set of candidate number of a fourth set of AL and a value G, wherein the value G is number of cell of a cell group. In some embodiments, the fourth set of candidate number of the fourth set of AL is configured in a search space configuration of the second cell.

In step S905, the UE 100 may determine a third set of candidate number of a third set of aggregation level for receiving a third DCI for single-cell scheduling which is configured for scheduling service (e.g., PDSCHs) on the third cell. The third DCI is a single-cell scheduling DCI. The UE 100 may receive the third DCI according to the third set of candidate number and the third set of AL on the first cell. The third DCI is configured for scheduling a PDSCH on the third cell, and the third set of candidate number and the third set of AL are corresponding to the search space with the first identity.

In some embodiments, the third set of candidate number of the third set of AL is configured in a search space configuration of the third cell.

In some embodiments, the third set of candidate number of the third set of AL is determined according to the first set of candidate number of the first set of AL and a fifth set of candidate number of a fifth set of AL. In some embodiments, the fifth set of candidate number of the fifth set of AL is configured in a search space configuration of the third cell.

Figure 10:
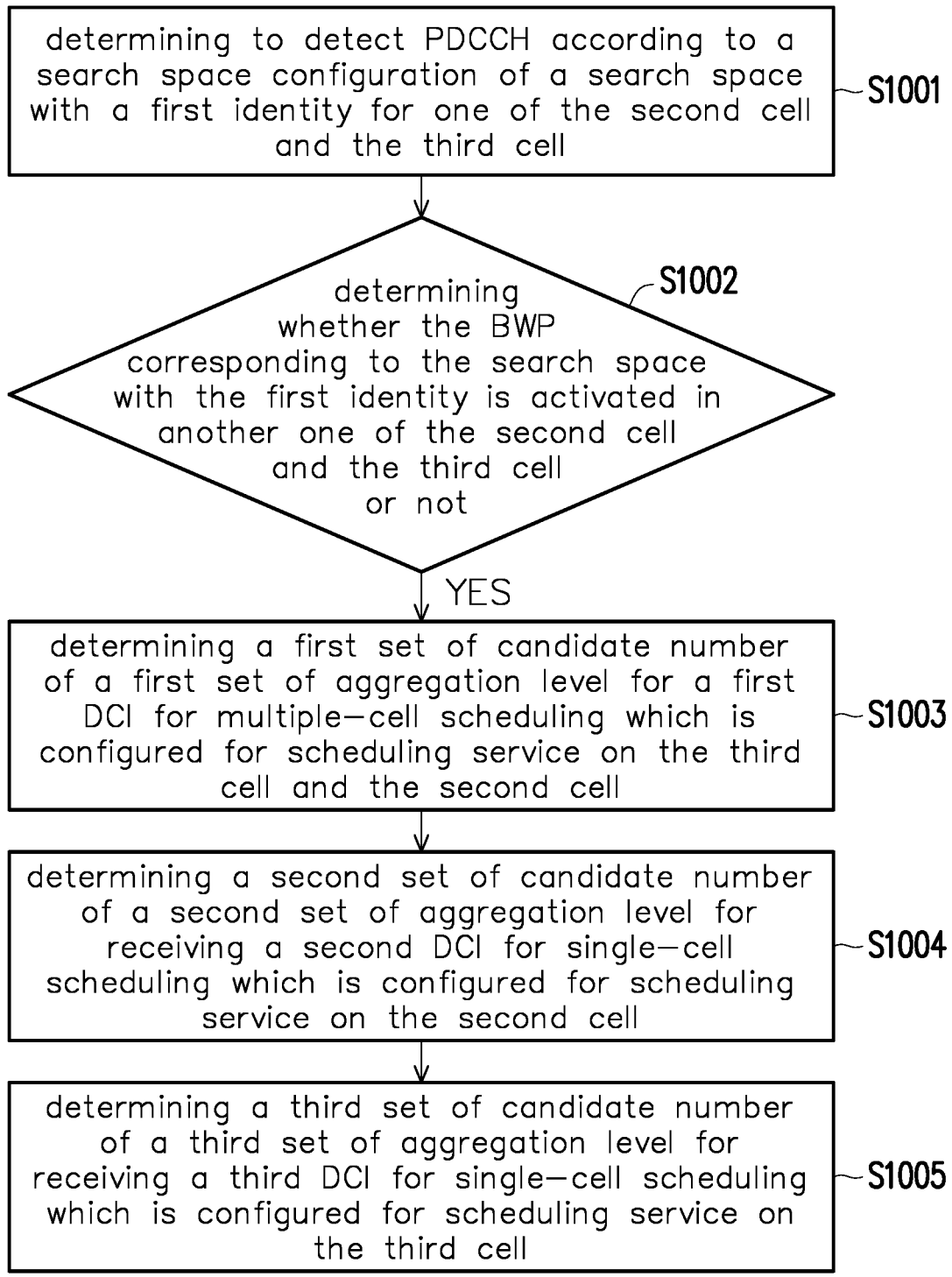
FIG. 10 is a flowchart of a method for d receiving downlink control information (DCI) according to an embodiment of the disclosure.

FIG. 10 is a flowchart of a method for receiving downlink control information (DCI) according to an embodiment of the disclosure. In FIG. 10, the first cell is a scheduling cell, and the second cell and the third cell are scheduled by the first cell. Referring to FIG. 10, in step S1001, the UE 100 may determine to detect PDCCH according to a search space configuration of a search space with a first identity for one of the second cell and the third cell. The first identity may be the search apace ID '#a'. Herein, since the BWP corresponding to the search space with search space ID '#a' is activated in the one of the second cell and the third cell, the UE 100 then perform step S1001. Further, the second cell and third cell are configured to be scheduled by the DCI format for multiple-cell scheduling.

In step S1002, the UE 100 may determine whether the BWP corresponding to the search space with the first identity is activated in another one of the second cell and the third cell or not. It should be noted that, in some embodiments, by performing the step S1001, the UE 100 may know that a DCI format for multiple-cell scheduling has been configured in the search space configuration of the search space with the first identity. Therefore, when the BWPs configured with the same search space with the first identity on the second cell and the third cell are activated simultaneously, the first DCI for multiple-cell scheduling may be utilized by the BS 200. Otherwise, the first DCI for multiple-cell scheduling may not be utilized by the BS 200.

If the determining result of step S1002 is yes, in step S1003, the UE 100 may determine a first set of candidate number of a first set of aggregation level for a first DCI for multiple-cell scheduling which is configured for scheduling service (e.g., PDSCHs) on the third cell and the second cell. Such that, the UE 100 may receive the first DCI for multiple-cell scheduling on the first cell. Herein, the first cell may be the second cell or the third cell, or the first cell may not be the second cell or the third cell.

Besides, if the determining result of step S1002 is no, which means there is not a multiple-cell scheduling utilized by the BS 200 for the second cell and the third cell, the UE 100 may directly perform the blind detection of PDCCH without determining the first set of candidate number of the first set of aggregation level for the first DCI for multiple-cell scheduling.

In step S1004, the UE 100 may determine a second set of candidate number of a second set of aggregation level for receiving a second DCI for single-cell scheduling which is configured for scheduling service (e.g., PDSCHs) on the second cell. The UE 100 may receive the second DCI according to the second set of candidate number and the second set of AL on the first cell. The second DCI is configured for scheduling a PDSCH on the second cell, and the second set of candidate number and the second set of AL are corresponding to the search space with the first identity. In some embodiments, the second set of candidate number of the second set of AL is configured in a search space configuration of the second cell.

In step S1005, the UE 100 may determine a third set of candidate number of a third set of aggregation level for receiving a third DCI for single-cell scheduling which is configured for scheduling service (e.g., PDSCHs) on the third cell. The UE 100 may receive the third DCI according to the third set of candidate number and the third set of AL on the first cell. The third DCI is configured for scheduling a PDSCH on the third cell, and the third set of candidate number and the third set of AL are corresponding to the search space with the first identity. In some embodiments, the third set of candidate number of the third set of AL is configured in a search space configuration of the third cell.

In some embodiments, if the UE 100 determine that the first DCI exists in the PDCCH on the first cell according to the DCI format of the first DCI, the UE may perform the blind detection of PDCCH for receiving the first DCI which is a multiple-cell scheduling DCI. Based on this, a second set of candidate number of a second set of aggregation level for receiving a second DCI which is a signal-cell scheduling DCI and a third set of candidate number of a third set of aggregation level for receiving a third DCI which is a signal-cell scheduling DCI may be varied depending on whether the first DCI exists in the PDCCH on the first cell or not. Besides, a first set of candidate number of a first set of aggregation level for receiving a first DCI may be defined based on the different rules and according to the search space configuration of the second cell or the search space configuration of the third cell.

In some embodiments, the second DCI and the third DCI which are single-cell scheduling DCIs may have the same format as the normal DCI format (e.g., format 1_1) for scheduling a service (e.g., PDSCH) on a single cell. In some embodiments, the first DCI may be a new defined DCI format (e.g., DCI format 1 N) for multiple-cell scheduling.

FIGS. 11A and 11B are schematic diagrams of search space design in a first scenario according to an embodiment of the disclosure. It should be noted that, "DCI candidates" may be also known as PDCCH candidates. In the first scenario, the first cell group includes one predetermined cell which is the cell A, and the second cell group includes one predetermined cell which is the cell B. Referring to FIG. 11A, in one embodiment, in order to keep total PDCCH blind decoding budget, the sum of candidate numbers at each aggregation level for receiving the multiple-cell scheduling DCI (i.e., DCI for service on cell A and cell B) and the single-cell scheduling DCIs (i.e., DCI for service on cell A or cell B) may stay consistent no matter whether the first DCI exist in the PDCCH on the cell A or not. In FIG. 11A, no matter whether the first DCI exist in the PDCCH on the cell A or not, the sum of candidate numbers at aggregation level '8' for receiving the multiple-cell scheduling DCI and the single-cell scheduling DCI is 20.

Referring to FIG. 11B, in one embodiment, in order to keep PDCCH allocation capacity, the sum of candidate number at each aggregation level for receiving the multiple-cell scheduling DCI and candidate number at each aggregation level for receiving the single-cell scheduling DCI may reduce if the first DCI exist in the PDCCH on the cell A, but the PDCCH allocation capacity would not increase. In FIG. 11B, if the first DCI exist in the PDCCH on the cell A, the sum of candidate numbers at aggregation level '8' for receiving the multiple-cell scheduling DCI and candidate numbers at aggregation level '8' for receiving the single-cell scheduling DCI is 18. In this case, the total scheduling opportunity for scheduling cell A and cell B is kept as 20.

Figure 12:
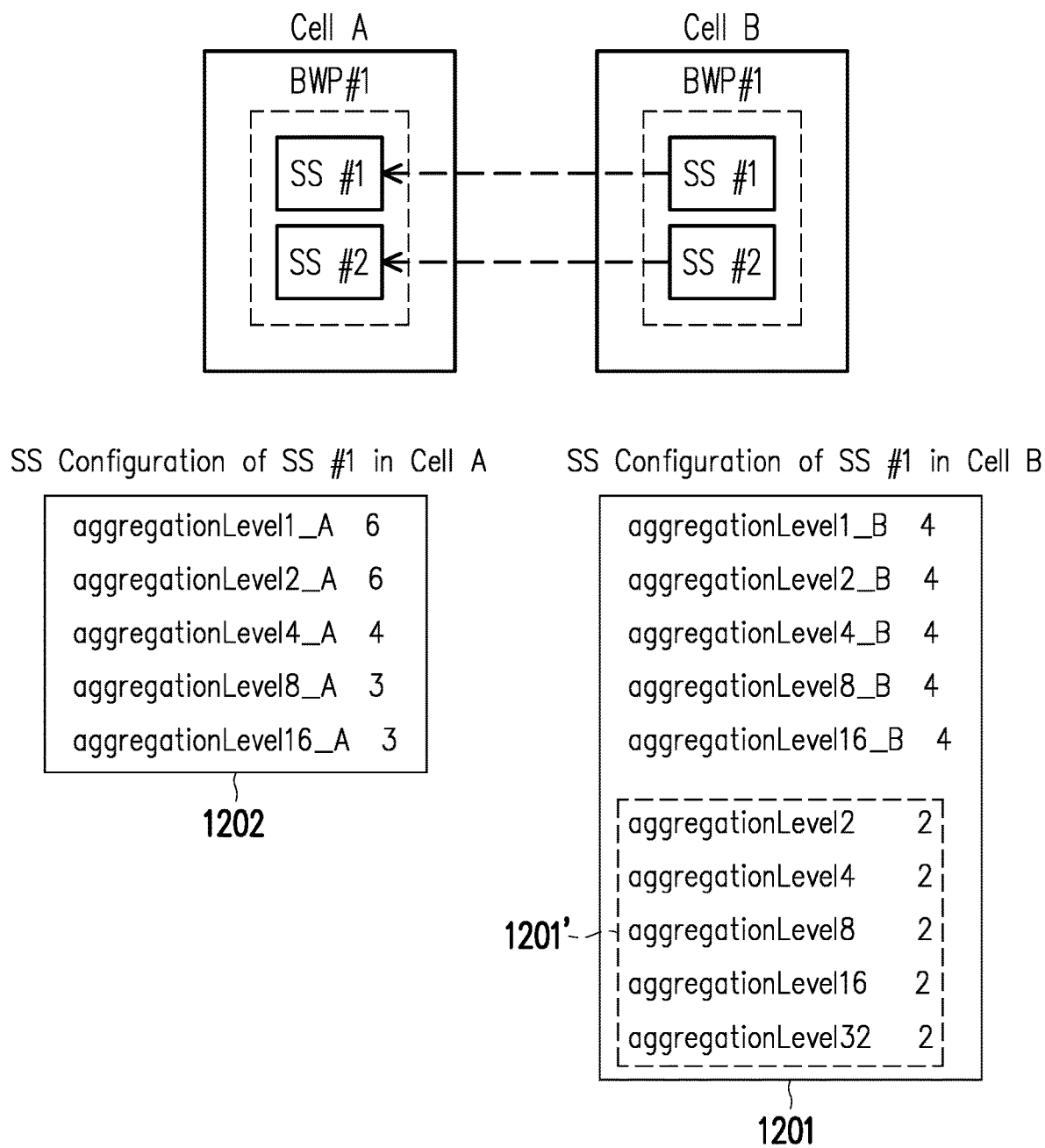
FIG. 12 is a schematic diagram of determining a first set of candidate number of a first set of aggregation level for receiving a first DCI according to an embodiment of the disclosure.

FIG. 12 is a schematic diagram of determining a first set of candidate number of a first set of aggregation level for receiving a first DCI according to an embodiment of the disclosure. In FIG. 12, the cell A and the cell B may respectively be the second cell and the third cell which are the scheduled cell in cross-carrier scheduling operation, and the first DCI is configured for scheduling PDSCHs on the cell A and the cell B. The first set of candidate number of a first set of aggregation level for receiving a first DCI configured for scheduling service (e.g., PDSCHs) on the cell A and the cell B may be determined according to the search space configuration 1201 of the search space #1 in the cell B, and the search space configuration 1201 of the cell B is configured by the BS 200. Specifically, in FIG. 12, when the UE 100 confirms that the first DCI is carried by the scheduling cell, the UE 100 may determine a first set of candidate number of a first set of aggregation level for receiving the first DCI according to parameters 1201' in the search space configuration 1201 of the cell B. For example, the candidate number at the aggregation level '2' is 2 for the UE 100 to search the first DCI with aggregation level '2', and the candidate number at the aggregation level '4' is also 2 for the UE 100 to search the first DCI with aggregation level '4'. In FIG. 12, a minimum AL of the first set of AL for receiving the first DCI is larger than one, and the maximum AL of the first set of AL for receiving the first DCI is larger than 16.

Figure 13:
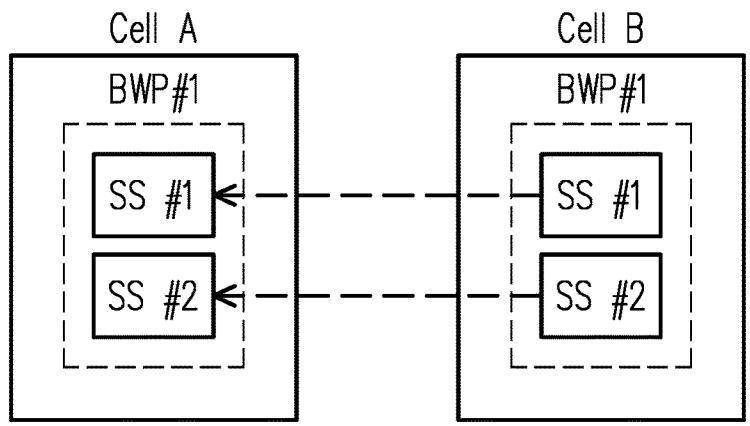
FIG. 13 is a schematic diagram of determining a first set of candidate number of a first set of aggregation level for receiving a first DCI according to an embodiment of the disclosure.

FIG. 13 is a schematic diagram of determining a first set of candidate number of a first set of aggregation level for receiving a first DCI according to an embodiment of the disclosure. In FIG. 13, the cell A and the cell B may respectively be the second cell and the third cell which are the scheduled cell in cross-carrier scheduling operation, and the first DCI is configured for scheduling PDSCHs on the cell A and the cell B. The first set of candidate number of a first set of aggregation level for receiving a first DCI configured for scheduling service (e.g., PDSCHs) on the cell A and the cell B may be determined according to the search space configuration 1301 of the search space #1 in the cell B, and the search space configuration 1301 of the cell B is configured by the BS 200. Specifically, in FIG. 13, when the UE 100 confirms that the first DCI is carried by the scheduling cell, the UE 100 may determine a first set of candidate number of a first set of aggregation level for receiving the first DCI according to parameters 1301' in the search space configuration 1301 of the cell B. In detail, the parameters 1301' includes a first parameter 'aggregationLevelR' and a second parameter 'N', wherein the first DCI may be applicable to the aggregation level(s) larger than N (e.g., N=1 in FIG. 13) which may be configured by the BS 200 or a fixed value. The first parameter 'aggregationLevelR' may be configured by the BS 200 or a fixed value. Accordingly, the first set of candidate number of the first set of aggregation level may be determined according to a ratio function and the first parameter 'aggregationLevelR' and the second parameter 'N' of the parameters 1301' in the search space configuration 1301. For example, the ratio function can be expressed as equitation (1):

$$\text{aggregationLevel}(i) = f1(\text{aggregationLevel}(i)\_B \times \text{aggregationLevelR}) \quad (1)$$

wherein $f1(\cdot) = \lceil \cdot \rceil$ or $f1(\cdot) = \lfloor \cdot \rfloor$; i represents the aggregation level and i=(N+1), (N+2), ..., M; M may be the maximum AL in the cell B or other value, and aggregationLevel(i)_B represents the candidate number in the search space configuration 1301 of the cell B. In FIG. 13, the first parameter 'aggregationLevelR' is 0.5 and the second parameter 'N' is 1, such that the first set of candidate number of the first set of aggregation level may include the candidate numbers '2' at the aggregation levels '2', '4', '8', '16' by assuming $f1(\cdot) = \lfloor \cdot \rfloor$.

Figure 14:
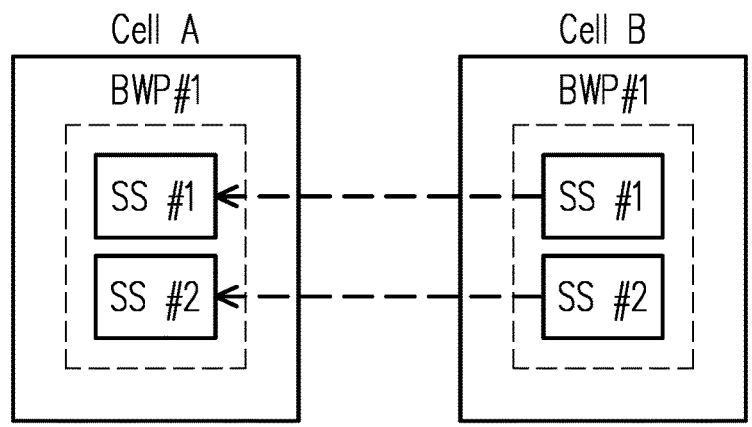
FIG. 14 is a schematic diagram of determining a first set of candidate number of a first set of aggregation level for receiving a first DCI according to an embodiment of the disclosure.

FIG. 14 is a schematic diagram of determining a first set of candidate number of a first set of aggregation level for receiving a first DCI according to an embodiment of the disclosure. In FIG. 14, cell A and cell B may respectively be the second cell and the third cell, and the first DCI is configured for scheduling PDSCHs on the cell A and the cell B. In FIG. 14, the first set of candidate number of the first set of aggregation level for receiving the first DCI configured for scheduling service (e.g., PDSCHs) on the cell A and the cell B may be determined according to the search space configuration 1401 of the search space #1 in the cell B and the search space configuration 1402 of the search space #1 in the cell A, and the search space configuration 1401, 1402 of the cell B and the cell A are configured by the BS 200. The first set of candidate number of the first set of aggregation level may be determined by comparing a candidate number at a aggregation level in the search space configuration 1401 and a candidate number at the same aggregation level in the search space configuration 1402, wherein the maximum value or the minimum value of the comparing result may be the candidate number at the same aggregation level of the first DCI. The first set of candidate number of the first set of aggregation level may be determined according to a function which can be expressed as equitation (2):

$$\text{aggregationLevel}(i) = f2(\text{aggregationLevel}(i)\_A, \text{aggregationLevel}(i)\_B) \quad (2)$$

wherein $f2(\cdot)$ is a function for searching the maximum value or the minimum value; i represents the aggregation level and i=2, 4, 8 ..., M; M may be the common maximum AL in the cell A and the cell B or other value; aggregationLevel(i)_A represents the candidate number in the search space configuration of the cell A; and aggregationLevel(i)_B represents the candidate number in the search space configuration of the cell B. For example, in FIG. 14, max(aggregationLevel16_A, aggregationLevel16_B)=min(3, 5)=5. That is, if $f2(\cdot)$ is a function for searching the maximum value, the first set of candidate number of the first set of aggregation level may include the candidate numbers '6', '4', '4' and '5' at the aggregation levels '2', '4', '8', '16'. For example, in FIG. 14, min(aggregationLevel16_A, aggregationLevel16_B)=min(3, 5)=3. That is, if $f2(\cdot)$ is a function for searching the minimum value, the first set of candidate number of the first set of aggregation level may include the candidate numbers '4', '4', '3' and '3' at the aggregation levels '2', '4', '8', '16'.

Figure 15A:
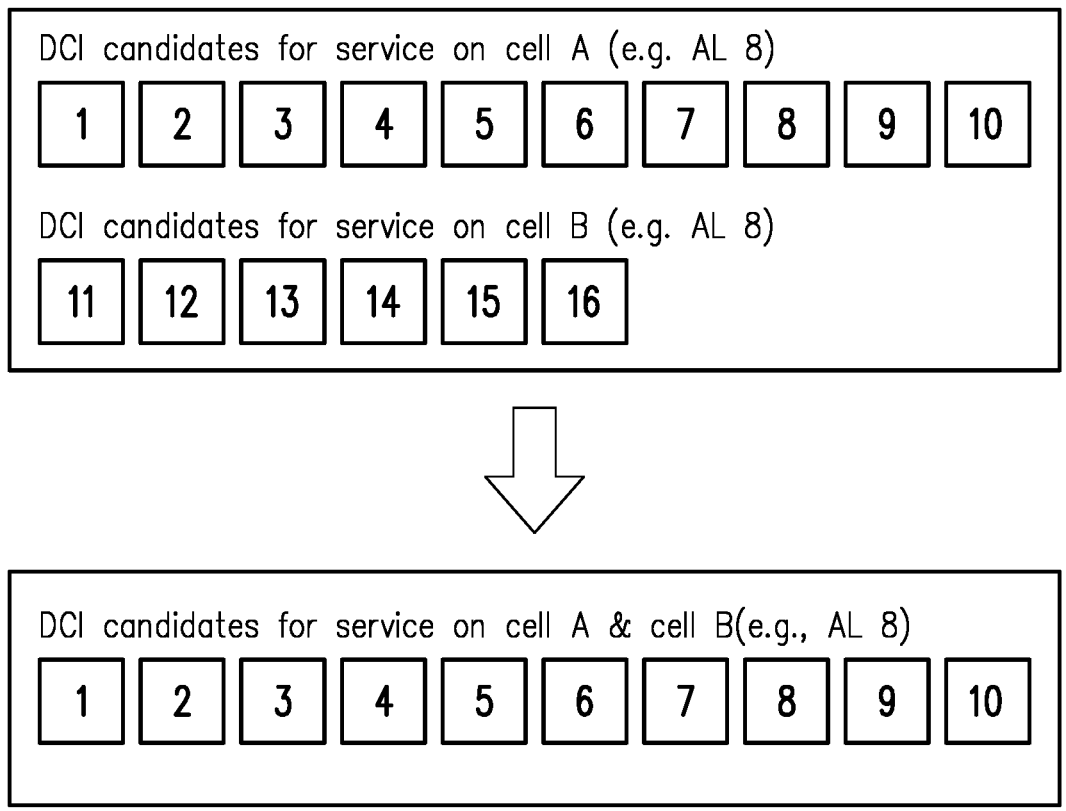

FIGS. 15A and 15B are schematic diagrams of search space design in a first scenario according to an embodiment of the disclosure. In the first scenario, the first cell group includes one predetermined cell which is the cell A, and the second cell group includes one predetermined cell which is the cell B. In one embodiment, when the UE 100 confirms that the first DCI is carried by the scheduling cell and may not expect to receive the single-cell scheduling DCI (e.g., format 1_1) for scheduling PDSCH in the cell A or/and the cell B, the candidate number at each aggregation level for receiving the multiple-cell scheduling DCI may be the maximum value among the candidate numbers at each aggregation level in the cell A and the cell B. For example, in FIG. 15A, the candidate numbers at aggregation level '8' for receiving the multiple-cell scheduling DCI is 10, since the candidate number at aggregation level '8' in the cell A for receiving the single-cell scheduling DCI and the candidate number at aggregation level '8' in the cell B for receiving the other single-cell scheduling DCI respectively are 10 and 6.

In one embodiment, when the UE 100 confirms that the first DCI is carried by the scheduling cell and may not expect to receive the single-cell scheduling DCI (e.g., format 1_1) for scheduling PDSCH in the cell A or/and the cell B, the candidate number at each aggregation level for receiving the multiple-cell scheduling DCI may be the sum of the candidate number at each aggregation level in the cell A and the candidate number at each aggregation level in the cell B. For example, in FIG. 15B, the candidate number at aggregation level '8' for receiving the multiple-cell scheduling DCI is 16, since the candidate number at aggregation level '8' in the cell A for receiving the single-cell scheduling DCI and the candidate number at aggregation level '8' in the cell B for receiving the other single-cell scheduling DCI respectively are 10 and 6.

Figure 16:
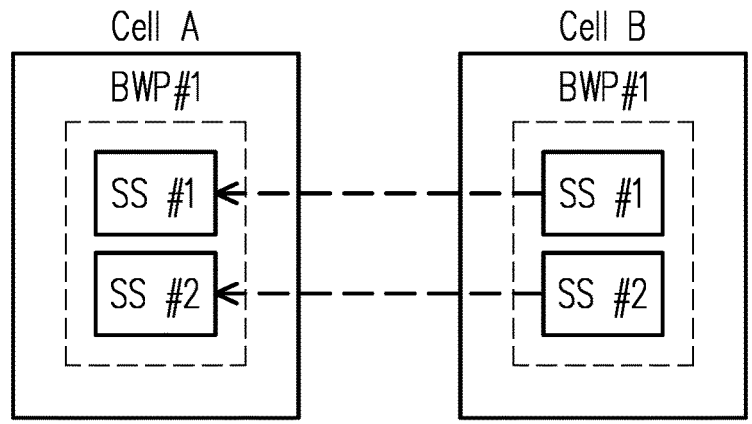
FIG. 16 is a schematic diagram of determining a first set of candidate number of a first set of aggregation level for receiving a first DCI according to an embodiment of the disclosure.

FIG. 16 is a schematic diagram of determining a first set of candidate number of a first set of aggregation level for receiving a first DCI according to an embodiment of the disclosure. In FIG. 16, cell A and cell B may respectively be the second cell and the third cell, and the first DCI is configured for scheduling PDSCHs on the cell A and the cell B. In FIG. 16, the first set of candidate number of the first set of aggregation level for receiving a first DCI configured for scheduling service (e.g., PDSCHs) in the cell A and the cell B may be determined according to the search space configuration 1601 of the search space #1 in the cell B and the search space configuration 1602 of the search space #1 in the cell A, and the search space configuration 1601, 1602 of the cell B and the cell A are configured by the BS 200. The first set of candidate number of the first set of aggregation level may be determined by comparing a candidate number at a aggregation level in the search space configuration 1601 and a candidate number at the same aggregation level in the search space configuration 1602, wherein the maximum value of the comparing result may be the candidate number of the first DCI at the same aggregation level. Alternatively, the first set of candidate number of the first set of aggregation level may be determined by summing a candidate number at a aggregation level in the search space configuration 1601 and a candidate number at the same aggregation level in the search space configuration 1602. Namely, the first set of candidate number of the first set of aggregation level may be determined according to a function which can be expressed as equitation (3):

$$\text{aggregationLevel}(i) = f3(\text{aggregationLevel}(i)\_A, \text{aggregationLevel}(i)\_B) \quad (3)$$

wherein $f3(\cdot)$ is a function for searching the maximum value or calculating the sum; i represents the aggregation level and i=2, 4, 8, . . . , M; M may be the maximum AL in the cell A and the cell B or other value; aggregationLevel(i)_A represents the candidate number in the search space configuration of the cell A; and aggregationLevel(i)_B represents the candidate number in the search space configuration of the cell B. For example, in FIG. 16, if $f3(\cdot)$ is a function for searching the maximum value, the first set of candidate number of the first set of aggregation level may include the candidate numbers '6', '4', '10' and '5' at the aggregation levels '2', '4', '8', '16'. If $f3(\cdot)$ is a function for calculating the sum, the first set of candidate number of the first set of aggregation level may include the candidate numbers '10', '8', '16', '8' at the aggregation levels '2', '4', '8', '16'.

In some embodiments, when the UE 100 confirms that the first DCI is carried by the scheduling cell and may not expect to receive the single-cell scheduling DCI (e.g., DCI format 1_1) for scheduling PDSCH in the scheduled cell(s), the first candidate number for the first DCI for scheduling PDSCHs in the scheduled cells may be determined according to either the search space configuration of one of the scheduled cells or the search space configuration of the other one of the scheduled cells. For example, the candidate number at each aggregation level for receiving a first DCI may be identical with the candidate number at each aggregation level for receiving a single-cell scheduling DCI in the search space configuration of one of the scheduled cells. Take FIG. 16 as an example, since the UE 100 may not expect to receive the single-cell scheduling DCI for scheduling PDSCH in the cell A and the cell B, the candidate numbers at the aggregation levels '2', '4', '8', '16' for receiving a first DCI may be '6', '4', '10', '3' which are identical with the candidate numbers for receiving a single-cell scheduling DCI in the search space configuration 1602. For other example, the candidate numbers at the aggregation levels '2', '4', '8', '16' for receiving a first DCI may be '4', '4', '6', '5' which are identical with the candidate numbers for receiving a single-cell scheduling DCI in the search space configuration 1601.

In some embodiments, after determining the first set of candidate number of the first set of aggregation level for receiving the first DCI, the UE 100 may then determine the a second set of candidate number of a second set of aggregation level for receiving a second DCI and a third set of candidate number of a third set of aggregation level for receiving a third DCI. It should be noted that, depending on the first DCI is carried by the scheduling cell and the UE 100 may expect to receive the first DCI which is a multiple-cell scheduling DCI, the second set of candidate number of the second set of aggregation level for receiving the second DCI being a single-cell scheduling DCI may be different from the original candidate numbers in the search space configuration of a search space in one corresponding cell. Similarly, depending on the first DCI is carried by the scheduling cell and the UE 100 may expect to receive the first DCI which is a multiple-cell scheduling DCI, the third set of candidate number of the third set of aggregation level for receiving the third DCI being a single-cell scheduling DCI may be different from the original candidate numbers in the search space configuration of a search space in one corresponding cell. In some embodiments, the second set of candidate number of the second set of aggregation level for receiving the second DCI and the third set of candidate number of the third set of aggregation level for receiving the third DCI may be determined according to at least one of the search space configurations of the cells being cross-carrier scheduling.

Please referring back to FIG. 12, the second set of candidate number for the second DCI (e.g., a DCI with DCI format 1_1) for scheduling a service (e.g., PDSCH) in the cell A may be determined according to search space configuration 1201 of SS #1 in the cell B and search space configuration 1202 of SS #1 in the cell A. The second set of candidate number of the second set of aggregation level may be determined according to a function which can be expressed as expression (4):

$$\max(\text{aggregationLevel}(i)\_A - f(\text{aggregationLevel}(i) \times R), 0) \quad (4)$$

wherein $f(\cdot)=\lceil \cdot \rceil$ or $f(\cdot)=\lfloor \cdot \rfloor$; i represents the aggregation level and i=2, 4, 8, . . . , M; M may be the common maximum AL in the cell A and the cell B or other value; aggregationLevel(i) represents the candidate number for receiving multi-cell scheduling DCI; and $0 \leq R \leq 1$ which may be configured by the BS 200 or a fixed value, e.g., R=0.5. For example, in FIG. 12, the first set of candidate number 'aggregationLevel(i)' may be provided in the search space configuration 1201 of SS #1 in the cell B. Assuming R=0.5. For the aggregation level '16' (i=16), the candidate number of the aggregation level '16' for receiving the second DCI may be '2', since max((3−2×0.5), 0)=2. For the aggregation level '8' (i=8), the candidate number of the aggregation level '8' for receiving the second DCI may be '2', since max((3−2×0.5), 0)=2. For the aggregation level '4' (i=4), the candidate number of the aggregation level '4' for receiving the second DCI may be '3', since max((4−2×0.5), 0)=3. However, expression (4) is one example for determining the second set of candidate number for the second DCI. In other embodiments, the second set of candidate number for the second DCI (e.g., a DCI with DCI format 1_1) for scheduling a service (e.g., PDSCH) in the cell A may be determined according to aggregationLevel(i) A, aggregationLevel(i) or R.

Further, the third candidate number for the third DCI (e.g., a DCI with DCI format 1_1) for scheduling a service (e.g., PDSCH) in the cell B may be determined according to the search space configuration 1201 of SS #1 in the cell B. The third set of candidate number of the third set of aggregation level may be determined according to a function which can be expressed as expression (5):

$$\max(\text{aggregationLevel}(i)\_B - f(\text{aggregationLevel}(i) \times (1-R)), 0) \quad (5)$$

wherein $f(\cdot)=\lceil \cdot \rceil$ or $f(\cdot)=\lfloor \cdot \rfloor$; i represents the aggregation level and i=2, 4, 8, . . . , M; M may be the common maximum AL in the cell A and the cell B or other value;

aggregationLevel(i) represents the candidate number for receiving multi-cell scheduling DCI; and $0 \leq R \leq 1$ may be configured by the BS 200 or a fixed value, e.g., R=0.5. For example, in FIG. 12, the first set of candidate number 'aggregationLevel(i)' may be provided in the search space configuration 1201 of SS #1 in the cell B. Assuming R=0.5. For the aggregation level '16' (i=16), the candidate number of the aggregation level '16' for receiving the third DCI may be '3', since max((4-2×(1-0.5)), 0)=3. For the aggregation level '8' (i=8) and the aggregation level '4' (i=4), the candidate number of the aggregation level '4' for receiving the third DCI may be '3', since max((4−2×(1-0.5)), 0)=2.

Please referring back to FIG. 13, the second set of candidate number for the second DCI (e.g., a DCI with DCI format 1_1) for scheduling a service (e.g., PDSCH) in the cell A may be determined according to search space configuration 1301 of SS #1 in the cell B and search space configuration 1302 of SS #1 in the cell A, and the search space configuration 1301 of the cell B and search space configuration 1302 of the cell A are configured by the BS 200. The second set of candidate number of the second set of aggregation level may be determined according to a function which can be expressed as expression (6):

$$\max(\text{aggregationLevel}(i)\_A - \text{aggregationLevel}(i), 0) \quad (6)$$

wherein i represents the aggregation level and i=2, 4, 8, . . . , M; M may be the common maximum AL in the cell A and the cell B or other value; aggregationLevel (i)_A represents the candidate number for receiving single-cell scheduling DCI in the search space configuration of the cell A; aggregationLevel(i) represents the candidate number for receiving multi-cell scheduling DCI. For example, in FIG. 13, the first set of candidate number 'aggregationLevel (i)' may be determined according to parameters 1301' in the search space configuration 1301 of the cell B and the equation (1). For the aggregation level '16' (i=16), the candidate number of the aggregation level '16' for receiving the second DCI may be '1', since max(3−⌊5·0.5⌋, 0)=1. Alternatively, for the aggregation level '16' (i=16), the candidate number of the aggregation level '16' for receiving the second DCI may be '0', since max(3−⌈5·0.5⌉, 0)=0.

Further, the third candidate number for the third DCI (e.g., a DCI with DCI format 1_1) for scheduling a service (e.g., PDSCH) in the cell B may be determined according to the search space configuration 1301 of SS #1 in Cell B. The third set of candidate number of the third set of aggregation level may be determined according to a function which can be expressed as expression (7):

$$\max(\text{aggregationLevel}(i)\_B - \text{aggregationLevel}(i), 0) \quad (7)$$

wherein i represents the aggregation level and i= 2, 4, 8, . . . , M; M may be the common maximum AL in the cell A and the cell B or other value; aggregationLevel(i)_B represents the candidate number for receiving single-cell scheduling DCI in the search space configuration of the cell B. For example, in FIG. 13, the first set of candidate number 'aggregationLevel(i)' may be determined according to parameters 1301' in the search space configuration 1301 of the cell B and the equation (1). For the aggregation level '16' (i=16), the candidate number of the aggregation level '16' for receiving the third DCI may be '3', since max(5−⌊5·0.5⌋, 0)=3. Alternatively, for the aggregation level '16' (i=16), the candidate number of the aggregation level '16' for receiving the second DCI may be '2', since max(3−⌈5·0.5⌉, 0)=2.

In some embodiments, the second set of candidate number for the second DCI (e.g., a DCI with DCI format 1_1) for scheduling a service (e.g., PDSCH) in a single cell may be directly recited in the search space configuration of the single cell, and the third set of candidate number for the third DCI (e.g., a DCI with DCI format 1_1) for scheduling a service (e.g., PDSCH) in another single cell may be directly recited in the search space configuration of the another single cell. Take FIG. 12 as an example for illustrating, in some embodiments, the second set of candidate number for the second DCI may be defined by the search space configuration 1202 of the cell A, and the third set of candidate number for the third DCI may be defined by the search space configuration 1201 of the cell B.

Figure 17:
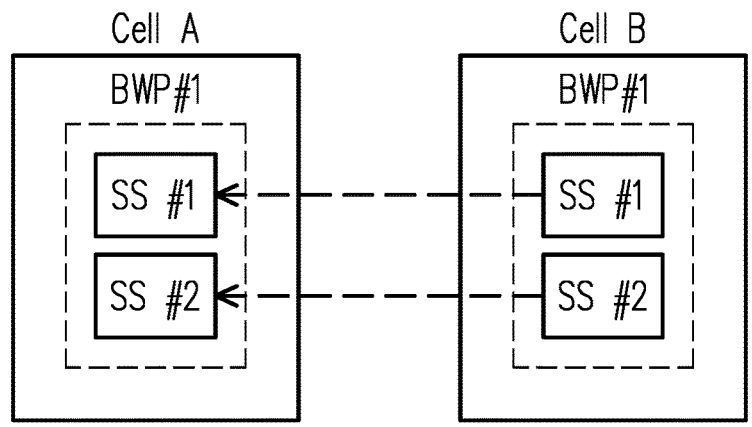
FIG. 17 is a schematic diagram of determining a second set of candidate number of a second set of aggregation level for receiving a second DCI according to an embodiment of the disclosure.

FIG. 17 is a schematic diagram of determining a second set of candidate number of a second set of aggregation level for receiving a second DCI according to an embodiment of the disclosure. In FIG. 17, when the UE 100 is indicated to receive a first DCI for scheduling PDSCHs on the cell A and the cell B according to search space #1, the UE 100 may determine the second set of candidate number of the second set of aggregation level for receiving the second DCI according to first part 1701' of the search space configuration 1701. Otherwise, when the UE 100 is not indicated to receive a first DCI for scheduling PDSCHs on the cell A and the cell B according to search space #1, the UE 100 may determine the second set of candidate number of the second set of aggregation level for receiving the second DCI according to the second part 1701" of the search space configuration 1701. For example, for the aggregation level '16', if the BWP #1 configured with the search space #1 is active (i.e., the UE 100 is indicated to receive a first DCI for scheduling PDSCHs on the cell A and the cell B according to search space #1), the candidate number at the aggregation level '16' for receiving the second DCI which is a single-cell scheduling DCI may be '6' according to the first part 1701' of the search space configuration 1701. Otherwise, for the aggregation level '16', if the BWP #1 configured with the search space #1 is not active (i.e., the UE 100 is not indicated to receive a first DCI for scheduling PDSCHs on the cell A and the cell B according to search space #1), the candidate number at the aggregation level '16' for receiving the second DCI which is a single-cell scheduling DCI may be '3' according to the second part 1701" of the search space configuration 1701.

Figure 18A:
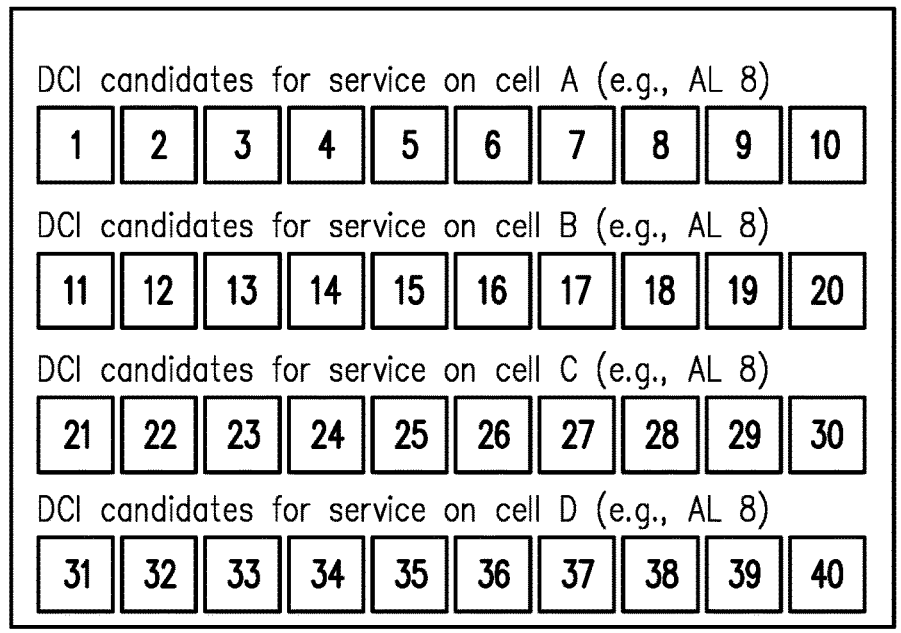
FIG. 18A to 18C are schematic diagrams of search space design in a second scenario according to an embodiment of the disclosure.
Figure 18B:
Figure 18C:
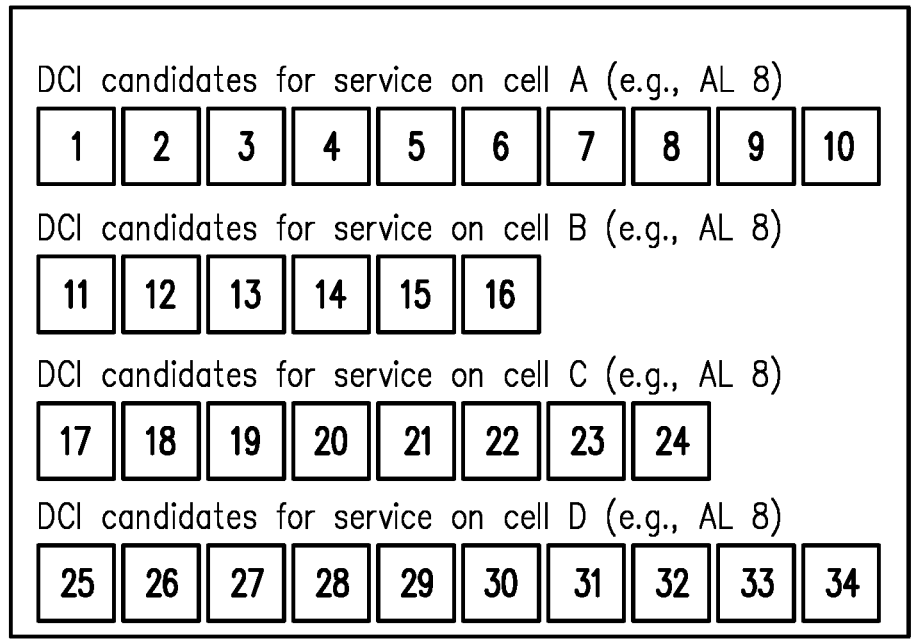

FIG. 18A to 18C are schematic diagrams of search space design in a second scenario according to an embodiment of the disclosure. In the second scenario, the first cell group includes predetermined cells which are the cell A, the cell C and the cell D, and the second cell group includes one predetermined cell which is the cell B. In some embodiments, the predetermined cells may be configured by the BS. Referring to FIG. 18A, in one embodiment, in order to keep total PDCCH blind decoding budget, the sum of candidate numbers at each aggregation level for receiving the multiple-cell scheduling DCIs (i.e., DCI for service on cell A and cell B, DCI for service on cell C and cell B, and DCI for service on cell D and cell B) and the single-cell scheduling DCIs (i.e., DCI for service on cell A, cell B, cell C or cell D) may stay consistent no matter whether the first DCI exist in the PDCCH on the cell A or not. In FIG. 18A, no matter whether the first DCI exists in the PDCCH on the cell A or not, the sum of candidate numbers at aggregation level '8' for receiving the multiple-cell scheduling DCIs and the single-cell scheduling DCIs is 40. In FIG. 18A, the candidate number at aggregation level '8' for receiving the multiple-cell scheduling DCI for service on cell A and cell B may be 2.

Referring to FIG. 18B, in one embodiment, in order to keep PDCCH allocation capacity, the sum of candidate numbers at each aggregation level for receiving the multiple-cell scheduling DCIs (i.e., DCI for service on cell A and cell B, DCI for service on cell C and cell B, and DCI for service on cell D and cell B) and candidate numbers at each aggregation level for receiving the single-cell scheduling DCIs (i.e., DCI for service on cell A, cell B, cell C or cell D) may reduce if the first DCI exist in the PDCCH on the cell A, but the PDCCH allocation capacity would not increase. In FIG. 18B, if the first DCI exist in the PDCCH on the cell A, the sum of candidate numbers at aggregation level '8' for receiving the multiple-cell scheduling DCIs and candidate numbers at aggregation level '8' for receiving the single-cell scheduling DCIs is 37.

Referring to FIG. 18C, in one embodiment, when the UE 100 confirms that the first DCI is carried by the scheduling cell and may not expect to receive the single-cell DCIs (e.g., format 1_1) for scheduling PDSCH in the cell A, the cell B, the cell C and the cell D, a candidate number at each aggregation level for receiving a multiple-cell scheduling DCI may be the maximum value among the candidate number at each aggregation level in one of the cell in the first cell group and the candidate number at each aggregation level in the cell B. For example, in FIG. 18C, the candidate number at aggregation level '8' for receiving the multiple-cell scheduling DCI configured for scheduling the cell A and the cell B is 10, since the candidate number at aggregation level '8' in the cell A for receiving the single-cell scheduling DCI and the candidate number at aggregation level '8' in the cell B for receiving the other single-cell scheduling DCI respectively are 10 and 6. The candidate number at aggregation level '8' for receiving the multiple-cell scheduling DCI configured for scheduling the cell C and the cell B is 8, since the candidate number at aggregation level '8' in the cell C for receiving the single-cell scheduling DCI and the candidate number at aggregation level '8' in the cell B for receiving the other single-cell scheduling DCI respectively are 8 and 6. Based on the same reason, the candidate number at aggregation level '8' for receiving the multiple-cell scheduling DCI configured for scheduling the cell D and the cell B is 10.

FIG. 19 is a schematic diagram of determining a first set of candidate number of a first set of aggregation level for receiving a first DCI according to an embodiment of the disclosure. In FIG. 19, the first cell group includes predetermined cells which are the cell A, the cell C and the cell D, and the second cell group includes one predetermined cell which is the cell B. One of the cells of the first cell group and the cell B may be scheduled by a multiple-cell scheduling DCI (i.e., the first DCI). That is, the cell A and the cell B may be scheduled by a multiple-cell scheduling DCI. The cell C and the cell B may be scheduled by a multiple-cell scheduling DCI. The cell D and the cell B may be scheduled by a multiple-cell scheduling DCI. The first set of candidate number of the first set of aggregation level for receiving the first DCI configured for scheduling service (e.g., PDSCHs) in one of the cells of the first cell group and the cell B may be determined according to the search space configuration 1901 of the search space #1 in the cell B, and the search space configuration 1901 of the cell B is configured by the BS 200. For example, the candidate number at the aggregation level '4' is 8 for the UE 100 to search the first DCI with aggregation level '4'; the candidate number at the aggregation level '8' is also 6 for the UE 100 to search the first DCI with aggregation level '8', and the candidate number at the aggregation level '16' is 2 for the UE 100 to search the first DCI with aggregation level '16'. In some embodiments, the first set of candidate number of the first set of aggregation level for the first DCIs configured to schedule the cell A with the cell B, to schedule the cell C with the cell B and to schedule the cell D with the cell B can be determined in the same way.

FIG. 20 is a schematic diagram of determining a first set of candidate number of a first set of aggregation level for receiving a first DCI according to an embodiment of the disclosure. In FIG. 20, the first cell group includes predetermined cells which are the cell A, the cell C and the cell D, and the second cell group includes one predetermined cell which is the cell B. One of the cells of the first cell group and the cell B may be scheduled by a multiple-cell scheduling DCI (i.e., the first DCI). That is, the cell A and the cell B may be scheduled by a multiple-cell scheduling DCI. The cell C and the cell B may be scheduled by a multiple-cell scheduling DCI. The cell D and the cell B may be scheduled by a multiple-cell scheduling DCI. The first set of candidate number of a first set of aggregation level for receiving a first DCI configured for scheduling service (e.g., PDSCHs) in one of the cells of the first cell group and the cell B may be determined according to the search space configuration 2001 of the search space #1 in the cell B, and the search space configuration 2001 of the cell B is configured by the BS 200. Specifically, in FIG. 20, the UE 100 may determine a first set of candidate number of a first set of aggregation level for receiving the first DCI according to parameters 2001' in the search space configuration 2001 of the cell B. In detail, the parameters 2001' includes a first parameter 'aggregationLevelR' and a second parameter 'N', wherein the first DCI may be applicable to the aggregation level(s) larger than N (e.g., N=1 in FIG. 20) which may be configured by the BS 200 or a fixed value. The first parameter 'aggregationLevelR' may be configured by the BS 200 or a fixed value. Accordingly, the first set of candidate number of the first set of aggregation level may be determined according to a ratio function and the first parameter 'aggregationLevelR' and the second parameter 'N' of the parameters 2001' in the search space configuration 2001. For example, the ratio function can be equitation (1) set above. In some embodiments, the first set of candidate number of the first set of aggregation level for the first DCIs configured to schedule the cell A with the cell B, to schedule the cell B with the cell B and to schedule the cell D with the cell B can be determined in the same way.

In some embodiments, in the second scenario, the first set of candidate number of the first set of aggregation level for receiving the first DCI configured for scheduling service (e.g., PDSCHs) in one of the cells of the first cell group (e.g. cell A, cell C or cell D in FIG. 7) and the only one cell (e.g. cell B in FIG. 7) in the second cell group may be determined according to the search space configuration of the search space #a in the only one cell in the second cell group and the search space configuration of the search space #a in the one of the cells of the first cell group, and the search space configurations are configured by the BS 200. For example, the first set of candidate number of the first set of aggregation level may be determined by comparing a candidate number at a aggregation level in the search space configuration of one of the cells in the first cell group and a candidate number at the same aggregation level in the search space configuration of the only one cell in the second cell group, wherein the maximum value or the minimum value of the comparing result may be the candidate number at the same aggregation level of the first DCI. Besides, the first set of candidate number of the first set of aggregation level for receiving the first DCI configured to schedule the rest other cells of the first cell group and the only one cell in the second cell group may be determined in the same way.

In some embodiments, in the second scenario, the first set of candidate number of the first set of aggregation level for receiving a first DCI configured for scheduling service (e.g., PDSCHs) in one of the cells of the first cell group (e.g. cell A, cell C or cell D in FIG. 7) and the only one cell (e.g. cell B in FIG. 7) in the second cell group may be determined according to the search space configuration of the search space #a in the only one cell in the second cell group and the search space configuration of the search space #a in the one of the cells of the first cell group, and the search space configurations are configured by the BS 200. The first set of candidate number of the first set of aggregation level may be determined by comparing a candidate number at a aggregation level in the search space configuration of the only one cell in the second cell group and a candidate number at the same aggregation level in the search space configuration of the one of the cells of the first cell group, wherein the maximum value of the comparing result may be the candidate number of the first DCI at the same aggregation level.

Alternatively, the first set of candidate number of the first set of aggregation level may be determined by summing a candidate number at a aggregation level in the search space configuration of the only one cell in the second cell group and a candidate number at the same aggregation level in the search space configuration of the one of the cells of the first cell group. The first set of candidate number of the first set of aggregation level for receiving the first DCI configured to schedule any one of the cells of the first cell group and the only one cell in the second cell group may be determined in the same way.

In some embodiments, in the second scenario, when the UE 100 confirms that the first DCI is carried by the scheduling cell and may not expect to receive the single-cell scheduling DCI (e.g., DCI format 1_1), the first candidate number for the first DCI for scheduling PDSCHs in the scheduled cells may be determined according to the search space configuration of one of the cells of the first cell group or the search space configuration of the only one cell in the second cell group. For example, the candidate number at each aggregation level for receiving a first DCI may be identical with the candidate number at each aggregation level for receiving a single-cell scheduling DCI in the search space configuration of one of the cells of the first cell group.

Regarding to the second DCI and the third DCI for single-cell scheduling in the second scenario, please referring back to FIG. 19, the second set of candidate number for the second DCI (e.g., a DCI with DCI format 1_1) for scheduling a service (e.g., PDSCH) in the cell A may be determined according to search space configuration 1901 of SS #1 in the cell B and search space configuration 1902 of SS #1 in the cell A.

The second set of candidate number of the second set of aggregation level may be determined according to a function which can be expression (4) set above. For example, in FIG. 19, the first set of candidate number 'aggregationLevel(i)' may be provided in the search space configuration 1901 of SS #1 in the cell B. Assuming R=0.5 in the expression (4). For the aggregation level '16' (i=16), the candidate number of the aggregation level '16' for receiving the second DCI for scheduling the single cell A may be '9', since max((10−2×0.5), 0)=9. Besides, the second set of candidate number of the second set of aggregation level for receiving the second DCI configured to schedule the other cell of the first cell group may be determined in the same way.

Further, in the second scenario, the third candidate number for the third DCI (e.g., a DCI with DCI format 1_1) for scheduling a service (e.g., PDSCH) in the cell B may be determined according to the search space configuration 1901 of SS #1 in the cell B. The third set of candidate number of the third set of aggregation level may be determined according to a function which can be expressed as expression (6):

$$\max(\text{aggregationLevel}(i)\_B - g(\text{aggregationLevel}(i) \times (1-R) \times G), 0) \quad (6)$$

wherein $g(\cdot)=\lceil \cdot \rceil$ or $g(\cdot)=\lfloor \cdot \rfloor$; G represents number of cells in the first cell group; i represents the aggregation level and i=2, 4, 8, . . . , M; M may be the common maximum AL in the cell A and the cell B or other value; and $0 \leq R \leq 1$ may be configured by the BS 200 or a fixed value. For example, in FIG. 19, the first set of candidate number 'aggregationLevel (i)' may be provided in the search space configuration 1901 of SS #1 in the cell B. Assuming R=0.5 in the expression (6). For the aggregation level '16' (i=16), the candidate number of the aggregation level '16' for receiving the third DCI may be '4', since max((10−2×(1−0.5)×3), 0)=7.

Regarding to the second DCI and the third DCI for single-cell scheduling in the second scenario, please referring back to FIG. 19, the second set of candidate number for the second DCI (e.g., a DCI with DCI format 1_1) for scheduling a service (e.g., PDSCH) in the cell A may be determined according to search space configuration 1901 of SS #1 in the cell B and search space configuration 1902 of SS #1 in the cell A. The second set of candidate number of the second set of aggregation level may be determined according to a function which can be the expression (6) set above. For example, for the aggregation level '16' (i=16), the candidate number of the aggregation level '16' for receiving the second DCI may be '8', since max(10−2, 0)=8. Besides, the second set of candidate number of the second set of aggregation level for receiving the second DCI configured to schedule the other cell of the first cell group may be determined in the same way.

Further, in the second scenario, the third candidate number for the third DCI (e.g., a DCI with DCI format 1_1) for scheduling a service (e.g., PDSCH) in the cell B may be determined according to the search space configuration 1301 of SS #1 in Cell B. The third set of candidate number of the third set of aggregation level may be determined according to a function which can be expressed as expression (7):

$$\max(\text{aggregationLevel}(i)\_B - \text{aggregationLevel}(i) \times G, 0) \quad (7)$$

wherein i represents the aggregation level and i=2, 4, 8, . . . , M; G represents total number of cells in the first cell group; M may be the common maximum AL in the cell A and the cell B or other value; aggregationLevel(i)_B represents the candidate number in the search space configuration of the cell B. For example, in FIG. 19, for the aggregation level '16' (i=16), the candidate number of the aggregation level '16' for receiving the third DCI for scheduling the cell B may be '4', since max(10−2×3, 0)=4.

In some embodiments, in the second scenario, the second set of candidate number for the second DCI (e.g., a DCI with DCI format 1_1) for scheduling a service (e.g., PDSCH) in a single cell of the first cell group may be directly recited in the search space configuration of the single cell of the first cell group, and the third set of candidate number for the third DCI (e.g., a DCI with DCI format 1_1) for scheduling a service (e.g., PDSCH) in another single cell of the second cell group may be directly recited in the search space configuration of the another single cell of the second cell group. Take FIG. 19 as an example for illustrating, in some embodiments, the second set of candidate number for the second DCI may be defined by the search space configuration 1902 of the cell A, and the third set of candidate number for the third DCI may be defined by the search space configuration 1901 of the cell B.

In some embodiments, in the third scenario illustrating in FIG. 8, the solutions for determining a first set of candidate number of a first set of aggregation level (AL) for receiving a first DCI, the solutions for determining a second set of candidate number of a second set of aggregation level for receiving a second DCI, and the solutions for determining a third set of candidate number of a third set of aggregation level for receiving a third DCI may be similar to the solutions in the above-mentioned exemplary embodiment, which is omitted to describe.

In some embodiments, the cell A is a scheduling cell of the cell B, the cell C and the cell D. A first cell group may include one or more predetermined cells (i.e., the cell A and the cell C). The second cell group comprises one or more predetermined cells (i.e., the cell B and the cell D). Search space #1 (i.e., search space with search space ID '1') and search space #2 (i.e., search space with search space ID '2') are configured to the activated BWP #1 of the cell A and the cell C in the first cell group, search space #1 is configured to the activated BWP #1 of the cell B in the second cell group, and search space #2 is configured to the activated BWP #1 of the cell D in the second cell group. That is, each cell in the second cell group may be scheduled by the same scheduling cell, but the search spaces configured to the activated BWP #1 of each cell in second cell group are different from each other. Hence, if both the first search space and the second search space are configured with a multi-cell scheduling DCI, the UE 100 may not expect that a activated BWP of one of cells in the second cell group and a activated BWP of the other one of cells in the second cell group are configured with the same search space ID. Therefore, in FIG. 8, according to the configured search space of the activated BWP of the cell B and the cell D in the second cell group, the UE 100 may apply the solutions in the second scenario described above to determine the candidate number for receiving the multi-cell scheduling DCI and the candidate number for receiving the single-cell scheduling DCI by respectively serving the cell B and the cell D as the only one predetermined cell in one cell group.

In some embodiments, the number of corresponding non-overlapped control channel element (CCE) of the first DCI for multiple-cell scheduling may be counted based on a shared budget of the second cell and the third cell. In some embodiments, the number of corresponding non-overlapped CCE of the first DCI for multiple-cell scheduling may be counted based on one of the second cell and the third cell, for example, according to a ratio which could be configured by the BS 200, a fixed value, or determined according to configuration of the BS 200. In some embodiments, the number of corresponding non-overlapped CCE of the first DCI for multiple-cell scheduling may be counted based on the second cell of the first cell group. In some embodiments, the number of corresponding non-overlapped CCE of the first DCI for multiple-cell scheduling may be counted based on the third cell of the second cell group.

In some embodiments, the first DCI for multiple-cell scheduling may include a first DCI field, a second DCI field and a third DCI field. The first DCI field is configured to indicate the PDSCH on the second cell, such as Modulation and Coding Scheme (MCS) level of the PDSCH on the second cell or the time-domain/frequency-domain resource of the second cell. The second DCI field is configured to indicate the PDSCH on the third cell, such as MCS level of the PDSCH on the third cell or the time-domain/frequency-domain resource of the third cell. The third DCI field is configured to indicate PUCCH resource for HARQ-ACK feedback for the PDSCH on the second cell and the PDSCH on the third cell, TCI state for determining QCL assumption of PDSCH, power control for PUCCH transmission, SRS request and/or CSI request.

In some embodiments, the UE 100 may receive the PDSCHs on the second cell and third cell according to a quasi-co location (QCL) assumption, wherein the QCL assumption is determined according to a TCI field of the first DCI. In some embodiments, the TCI field is configured for the second cell or the third cell. Take FIG. 6 as an example, the QCL assumption is determined according to the TCI field of the DCI 601 configured for the cell A or the cell B. Take FIG. 7 as an example, the QCL assumption is determined according to the TCI field of the DCI 607 configured for the cell B or the cell C.

In some embodiments, the UE 100 may transmit a HARQ-ACK feedback for the PDSCHs on a first slot, wherein a second slot is configured for receiving one of the PDSCHs on one of the plurality of cells, the first slot is the $(n+K1)^{th}$ slot, the second slot is the $n^{th}$ slot, and the value K1 is indicated by the first DCI. In some embodiments, the second slot is a later slot among at least one slot configured for receiving the PDSCHs respectively on the plurality of cells. In some embodiments, the second slot is configured for receiving one of the PDSCHs on the second cell or on the third cell. In some embodiments, the ordering of HARQ-ACK for the PDSCH transmitted on the plurality of cells is determined according to cell indexes of the plurality of cells or group indexes of the first cell group and/or the second bell group.

Figure 21A:
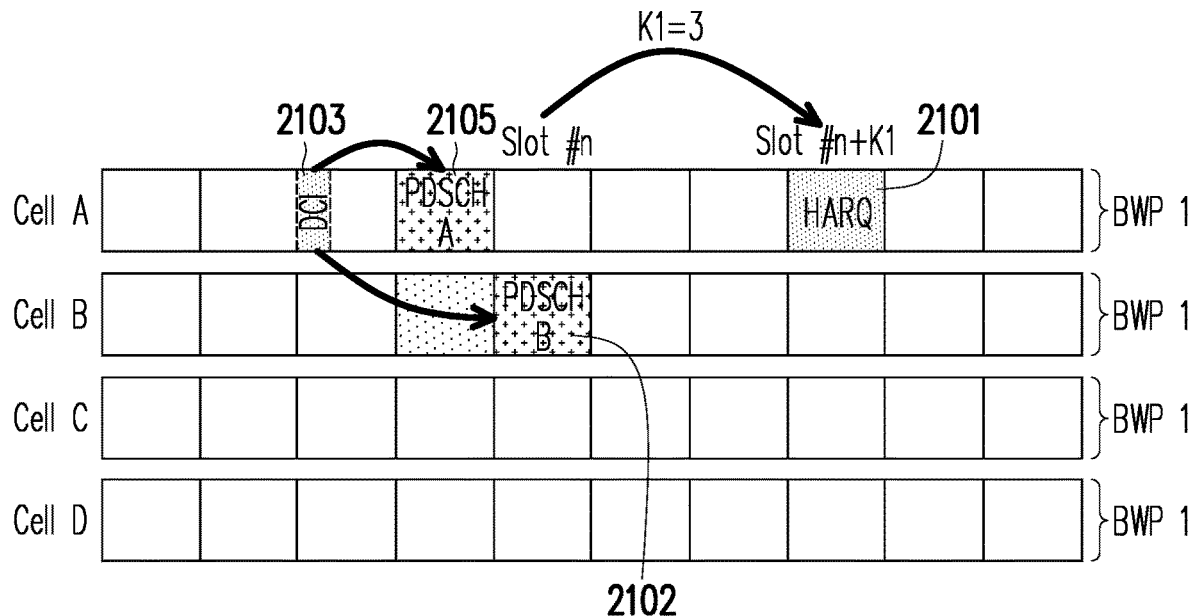
FIG. 21A to 21B is a schematic diagram of transmit a HARQ-ACK feedback for the PDSCH according to an embodiment of the disclosure.
Figure 21B:
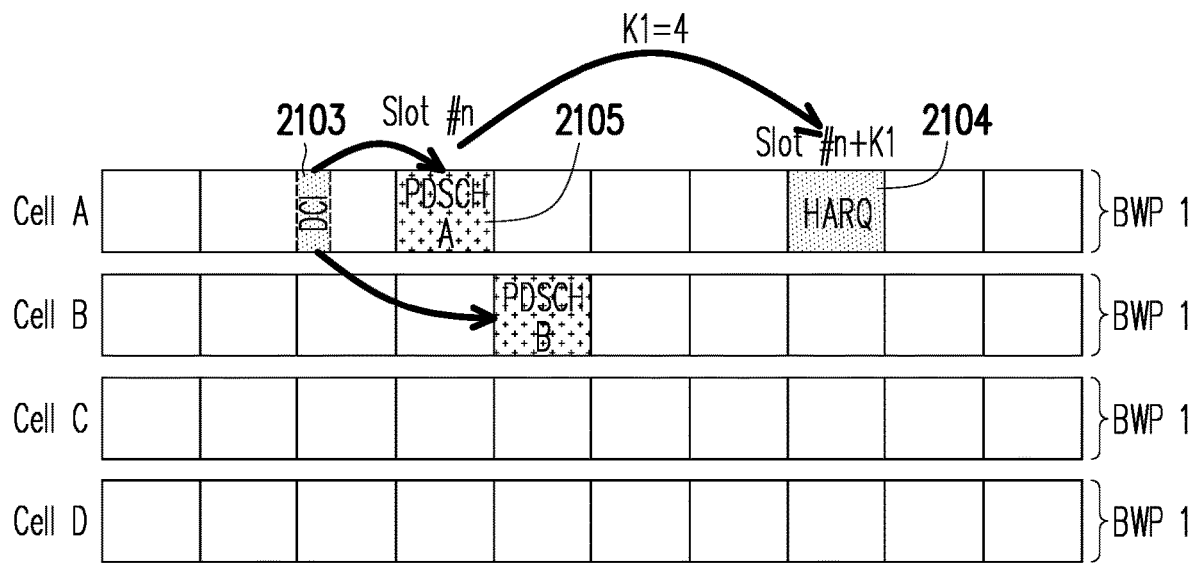

FIG. 21A to 21B is a schematic diagram of transmit a HARQ-ACK feedback for the PDSCH according to an embodiment of the disclosure. Referring to FIG. 21A, the UE 100 may transmit HARQ-ACK 2101 in response to the PDSCH 2102 scheduled on the cell B by the first DCI 2103 on a slot # (n+K1), wherein n is the slot index of the PDSCH 2102, and K1 may be indicated by the first DCI 2103. Referring to FIG. 21B, in response to the PDSCH 2105 scheduled on the cell A by the first DCI 2103, the UE 100 may transmit HARQ-ACK 2104 on a slot # (n+K1), wherein n is the slot index of the PDSCH 2105, and K1 may be indicated by the first DCI 2103.

In some embodiments, a first slot duration of the current activated BWP in the second cell for receiving a first PDSCH scheduled by the first DCI may be the same as a second slot duration of the current activated BWP in the third cell for receiving a second PDSCH scheduled by the first DCI.

In view of the aforementioned descriptions, the present disclosure provides a method for receiving downlink control information. Search space design for a multiple-cell scheduling DCI and a single-cell scheduling DCI are disclosed in the embodiments of the disclosure. Such that, the UE may perform the blind detection of PDCCH accordingly to receive the multiple-cell scheduling DCI or/and the single-cell. It should be noted that this disclosure does not require all the aforementioned advantages.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations could be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for receiving downlink control information (DCI), comprising:

determining a first set of candidate number of a first set of aggregation level (AL) for receiving a first DCI; and receiving the first DCI according to the first set of candidate number and the first set of AL on a first cell, wherein the first DCI is configured for scheduling physical downlink shared channels (PDSCHs) on a plurality of cells, the plurality of cells comprises a second cell and a third cell, and the first set of candidate number and the first set of AL are corresponding to a search space with a first identity, wherein the method further comprises:

receiving the PDSCHs on the second cell and the third cell according to the first DCI, wherein the PDSCHs comprises a first PDSCH on the second cell and a second PDSCH on the third cell, the first PDSCH is received on a second slot, and the second slot is the $n^{th}$ slot and the latest slot among at least one slot configured for receiving the PDSCHs respectively on the plurality of cells;

transmitting a HARQ-ACK feedback on a first slot for the first PDSCH and the second PDSCH, wherein the first slot is the $(n+K1)^{th}$ slot, and the value K1 is a fixed value indicated by a DCI field of the first DCI for the first PDSCH and the second PDSCH, wherein the second cell and the third cell are different cells, and the value K1 is an integer greater than 0, wherein the $(n+K1)^{th}$ slot for transmitting the HARQ-ACK feedback of the first PDSCH and the second PDSCH respectively on the second cell and the third cell is determined according to the value K1 indicated by the DCI field and the latest slot among the at least one slot configured for receiving the PDSCHs.

2. The method according to claim 1, wherein the first cell and the third cell are the same cell.

3. The method according to claim 1, wherein a minimum AL of the first set of AL for receiving the first DCI is larger than one.

4. The method according to claim 1, wherein a maximum AL of the first set of AL for receiving the first DCI is larger than 16.

5. The method according to claim 1, wherein the first set of candidate number of the first set of AL for receiving the first DCI is configured in a search space configuration of the second cell or a search space configuration of the third cell.

6. The method according to claim 1, wherein the first DCI is received according to a cell index of the second cell or a cell index of the third cell.

7. The method according to claim 1, wherein the first cell is a scheduling cell of the second cell and the third cell.

8. The method according to claim 1, wherein the third cell is included in a cell group comprising at least one predetermined cell.

9. The method according to claim 1, further comprising:

determining the third cell is one of the plurality of cells according to a cell index of the third cell in a field of the first DCI.

10. The method according to claim 1, further comprising:

determining a second set of candidate number of a second set of AL for receiving a second DCI; and receiving the second DCI according to the second set of candidate number and the second set of AL on the first cell, wherein the second DCI is configured for scheduling a PDSCH on the second cell, and the second set of candidate number and the second set of AL are corresponding to the search space with the first identity.

11. The method according to claim 10, wherein the second set of candidate number of the second set of AL is configured in a search space configuration of the second cell.

12. The method according to claim 10, wherein the second set of candidate number of the second set of AL is determined according to at least one of the first set of candidate number of the first set of AL, a fourth set of candidate number of a fourth set of AL and a value, wherein the value is number of cell of a cell group.

13. The method according to claim 12, wherein the fourth set of candidate number of the fourth set of AL is configured in a search space configuration of the second cell.

14. The method according to claim 1, further comprising:

determining a third set of candidate number of a third set of AL for receiving a third DCI; and receiving the third DCI according to the third set of candidate number and the third set of AL on the first cell, wherein the third DCI is configured for scheduling a PDSCH on the third cell, and the third set of candidate number and the third set of AL are corresponding to the search space with the first identity.

15. The method according to claim 14, wherein the third set of candidate number of the third set of AL is configured in a search space configuration of the third cell.

16. The method according to claim 14, wherein the third set of candidate number of the third set of AL is determined according to the first set of candidate number of the first set of AL and a fifth set of candidate number of a fifth set of AL.

17. The method according to claim 16, wherein the fifth set of candidate number of the fifth set of AL is configured in a search space configuration of the third cell.

18. The method according to claim 1, wherein the first set of candidate number for receiving the first DCI is determined according to candidate numbers in a search space configuration of the second cell.

19. The method according to claim 1, wherein the first set of candidate number for receiving the first DCI is determined according to candidate numbers in a search space configuration of the third cell.

20. The method according to claim 1, wherein the first set of candidate number for receiving the first DCI is determined according to a shared candidate budget of the second cell and the third cell.

21. The method according to claim 1, further comprising:

receiving the PDSCHs on the second cell and the third cell according to a QCL assumption, wherein the QCL assumption is determined according to a TCI field of the first DCI.

22. The method according to claim 21, wherein the TCI field is configured for the second cell or the third cell.

23. The method according to claim 1, wherein the second slot is configured for receiving one of the PDSCHs on the second cell or on the third cell.

24. The method according to claim 1, wherein the ordering of HARQ-ACK for the PDSCH transmitted on the plurality of cells is determined according to cell indexes of the plurality of cells.

25. The method according to claim 1, wherein a bandwidth part corresponding to the search space with the first identity is activated on the second cell, and another bandwidth part corresponding to the search space with the first identity is also activated on the third cell.

26. The method according to claim 1, wherein both of the second cell and the third cell are configured with a DCI format of the first DCI.

27. The method according to claim 1, wherein the first set of candidate number for receiving the first DCI is counted on the third cell, and the third cell is configured with a search space of the first identity.

28. The method according to claim 1, wherein the number of corresponding non-overlapped CCE of the first DCI is counted on the third cell, and the third cell is configured with a search space of the first identity.

29. The method according to claim 1, wherein the plurality of cells are configured in one of a plurality of cell groups for multi-cell scheduling.

30. A user equipment comprising:
- a transceiver; and
- a processor connected to the transceiver and configured at least to:
  - determining a first set of candidate number of a first set of aggregation level (AL) for receiving a first DCI; and
  - receiving the first DCI according to the first set of candidate number and the first set of AL on a first cell,
  - wherein the first DCI is configured for scheduling PDSCHs on a plurality of cells, and the plurality of cells comprises a second cell and a third cell, and the first set of candidate number and the first set of AL are corresponding to a search space with a first identity,
- wherein the processor is further configured to:
- receiving the PDSCHs on the second cell and the third cell according to the first DCI, wherein the PDSCHs comprises a first PDSCH on the second cell and a second PDSCH on the third cell, the first PDSCH is received on a second slot, and the second slot is the $n^{th}$ slot and the latest slot among at least one slot configured for receiving the PDSCHs respectively on the plurality of cells;
- transmitting a HARQ-ACK feedback on a first slot for the first PDSCH and the second PDSCH on a first slot, wherein the first slot is the $(n+K1)^{th}$ slot, and the value K1 is a fixed value indicated by a DCI field of the first DCI for the first PDSCH and the second PDSCH,
- wherein the second cell and the third cell are different cells, and the value K1 is an integer greater than 0,
- wherein the $(n+K1)^{th}$ slot for transmitting the HARQ-ACK feedback of the first PDSCH and the second PDSCH respectively on the second cell and the third cell is determined according to the value K1 indicated by the DCI field and the latest slot among the at least one slot configured for receiving the PDSCHs.

* * * * *